US012674778B2

(12) United States Patent (10) Patent No.: US 12,674,778 B2
Johnson, Jr. et al. (45) Date of Patent: Jul. 7, 2026

(54) GRAPHENE-ENABLED DNA BIOSENSORS WITH ENHANCED SENSITIVITY AND SPECIFICITY

(71) Applicant: THE TRUSTEES OF THE UNIVERSITY OF PENNSYLVANIA, Philadelphia, PA (US)

(72) Inventors: Alan T. Johnson, Jr., Philadelphia, PA (US); Zhaoli Gao, Philadelphia, PA (US); Han Xia, Chongqing (CN)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 1284 days.

(21) Appl. No.: 16/978,895

(22) PCT Filed: Mar. 8, 2019

(86) PCT No.: PCT/US2019/021367
§ 371 (c)(1),
(2) Date: Sep. 8, 2020

(87) PCT Pub. No.: WO2019/173725
PCT Pub. Date: Sep. 12, 2019

(65) Prior Publication Data
US 2021/0048407 A1 Feb. 18, 2021

Related U.S. Application Data

(60) Provisional application No. 62/640,753, filed on Mar. 9, 2018.

(51) Int. Cl.
*G01N 27/414* (2006.01)
*G01N 27/327* (2006.01)
(Continued)

(52) U.S. Cl.
CPC ....... *G01N 27/4145* (2013.01); *G01N 27/327* (2013.01); *G01N 27/407* (2013.01); *G01N 27/411* (2013.01)

(58) Field of Classification Search
CPC ............. G01N 27/4145; G01N 27/327; G01N 27/407; G01N 27/411; G01N 27/4146; G01N 33/48707; C12Q 1/6813; C12Q 1/6825; C12Q 1/6874; C12Q 1/686; C12Q 1/6869
(Continued)

(56) References Cited

U.S. PATENT DOCUMENTS 6,326,215 B1 12/2001 Keen
2007/0132043 A1 6/2007 Bradley et al.
(Continued)

OTHER PUBLICATIONS

Huang, J. et al. (2013). A new strategy for designing a graphene oxide-based DNA hairpin probe: fluorescence upon switching the orientation of the sticky end. Chem. Commun. 49. 9827-9829. (Year: 2013).*
(Continued)

*Primary Examiner* — Charles Capozzi
*Assistant Examiner* — Jacqueline Brazin
(74) *Attorney, Agent, or Firm* — BakerHostetler

(57) ABSTRACT
Provided are electronic biosensors based on graphene field effect transistors that utilize engineered hairpin probe DNA that allows for target recycling and hybridization chain reactions.

20 Claims, 22 Drawing Sheets
Specification includes a Sequence Listing.

(51) Int. Cl.
      G01N 27/407        (2006.01)
      G01N 27/411        (2006.01)
(58) Field of Classification Search
      USPC ......................................... 435/287.2; 506/38
      See application file for complete search history.

(56)                    References Cited

U.S. PATENT DOCUMENTS

2009/0054272  A1    2/2009  Prud et al.
2009/0084678  A1    4/2009  Joshi et al.
2009/0321721  A1   12/2009  Malenfant et al.
2010/0025660  A1    2/2010  Jain et al.
2010/0140219  A1    6/2010  Liang
2010/0279426  A1   11/2010  Tour et al.
2010/0327847  A1   12/2010  Leiber et al.

OTHER PUBLICATIONS

Wang, L. et al. (2014). "Graphene sheets, polyaniline and AuNPs based DNA sensor for electrochemical determination of BCR/ABL fusion gene with functional hairpin probe." 51. 201-207. (Year: 2014).*

Yang, W. et al. (2018). "A cascade amplification strategy of catalytic hairpin assembly and hybridization chain reaction for the sensitive fluorescent assay of the model protein carcinoembryonic antigen." Mirochemicia Acta. 185(100). 1-7. (Year: 2018).*

Gao, Z. et al. (2016). Scalable production of sensor arrays based on high-mobility hybrid graphene field effect transistors. ACS. Appl. Mater. Interfaces. 8(41). 27546-27552. (Year: 2016).*

Zhaoli, G., et al., "Detection of Sub-fM DNA with Target Recycling and Self-Assembly Amplification on Graphene Field Effect Biosensors," Nano Letters, vol. 18, 6, May 2018, pp. 3509-3515.

Ao, et al., "Enhancement of CO Detection in Al Doped Grapheme", Chemical Physics Letters 2008, 461(4-6), 276-279.

Chen, et al., "Graphene Nano-Ribbon Electronics", Physica E-Low-Dimensional Systems & Nanostructures 2007, 40(2), 228-232.

Chen, et al., "Intrinsic and Extrinsic Performance Limits of Graphene Devices on SiO2", Nature Nanotechnology, 2008, 3(4), 206-209.

Dan, et al., "Intrinsic Response of Graphene Vapor Sensors", Nano Letters 2009, 9(4), 1472-1475.

Johnson, et al., "Free Energy Landscape of a DNA-Carbon Nanotube Hybrid Using Replica Exchange Molecular Dynamics", Nano Letters 2009, 9(2), 537-541.

Johnson, et al., "Probing the Structure of DNA-Carbon Nanotube Hybrids with Molecular Dynamics", Nano Letters, 2008, 8(1), 69-75.

Ishigami, et al., "Atomic Structure of Graphene on SiO2", Nano Letters, epub May 11, 2007, 7, 1643-1648.

Mohanty et al "Graphene-based single-bacterium resolution biodevice and DNA transistor: interfacting Graphene derivatives with nanoscale and microscale biocomponents" Nano Letters 2008, 8: 4469-4476.

Mohanty et al, On line Supporting Document: "Graphene based single-bacteriumm biodevice and DNA transistor: Interfacing graphene derivatives with nano and micro scale biocomponents" Nano Letters 2008 vol. 8 pp. 1-18.

Novak, et al., "Nerve Agent Detection Using Networks of Single-Walled Carbon Nanotubes", Applied Physics Letters, 2003, 83(19), 4026-4028.

Radosavljevic et al "Novolatile molecular memory elements based on ambipolar nanotube field effect transistors" Nano Letters, 2002 @: 761-764.

Robinson, et al., "Reduced Graphene Oxide Molecular Sensors", Nano Letters, Sep. 2008, 8(10), 3137-40.

Schedin, et al., "Detection of Individual Gas Molecules Adsorbed on Graphene", Nature Materials, 2007, 6(9), 652-655.

Seiyama, et al., "A New Detector for Gaseous Components Using Semiconductive Thin Films", Analytical Chemistry, 1962, 34(11), 1502-1503.

Staii, et al., "DNA-Decorated Carbon Nanotubes for Chemical Sensing", Nano Letters, 2005, 5, 1774-1778.

Zhang, et al., "Improving Gas Sensing Properties of Graphene by Introducing Dopants and Defects: a First-Principles Study", Nano-technology, Apr. 2009, 20(18), 9 pgs.

Bi et al., Hybridization chain reaction: a versatile molecular tool for biosensing, bioimaging, and biomedicine, Chem. Soc. Rev., 2017, 46, 4281-4298, DOI: 10.1039/C7CS00055C (Review Article).

Bonnet et al., "Thermodynamic basis of the enhanced specificity of structured DNA probes," Proc. Natl. Acad. Sci., May 1999, 96(11), 6171-6176.

Cai et al., "Ultrasensitive label-free detection of PNA-DNA hybrid-ization by reduced graphene oxide field-effect transistor biosensor," ACS Nano., Mar. 2014, 8(3), 2632-2638.

Chen et al., "Dielectric screening enhanced performance in graphene FET," Nano Lett., Jul. 2009, 9(7), 2571-2574.

Choi et al., "Next-generation in situ hybridization chain reaction: higher gain, lower cost, greater durability," ACS Nano., May 2014, 8(5), 4284-4294.

Dirks et al., "Triggered amplification by hybridization chain reac-tion," Proc. Natl. Acad. Sci. U. S. A., Oct. 2004, 101(43), 15275-15278.

Dong et al., "Electrical detection of DNA hybridization with single-base specificity using transistors based on CVD-grown graphene sheets," Adv. Mater., Apr. 2010, 22, 1649-1653.

Gao et al., "Scalable Production of Sensor Arrays Based on High-Mobility Hybrid Graphene Field Effect Transistors", ACS Appl. Mater Interfaces, 2016, 8(41), 27546-27552, Abstract, p. 24546, col. 2 to p. 24547, col. 1.

Hayes et al., "MicroRNAs in cancer: biomarkers, functions and therapy," Trends Mol. Med., Aug. 2014, 20(8), 460-469.

Heller et al., "Identifying the mechanism of biosensing with carbon nanotube transistors," Nano Lett., Feb. 2007, 8(2), 591-595.

Lerner et al., "Scalable production of highly sensitive nanosensors based on graphene functionalized with a designed G protein-coupled receptor," Nano Lett., May 2014, 14(5), 2709-2714.

Lerner et al., "Toward quantifying the electrostatic transduction mechanism in carbon nanotube molecular sensors," J. Am. Chem. Soc., Sep. 2012, 134(35), 14318-14321.

Liu et al., "Giant enhancement in vertical conductivity of stacked CVD graphene sheets by self-assembled molecular layers," Nat. Commun., Nov. 2014, 5, 5461.

McManus et al., "MicroRNAs in platelet function and cardiovas-cular disease," Nat. Rev. Cardiol., Dec. 2015, 12(12), 711-717.

Morozov et al., "Giant intrinsic carrier mobilities in graphene and its bilayer," Phys. Rev. Lett., Jan. 2008, 100(1), 016602.

Okahata et al., "Kinetic measurements of DNA hybridization on an oligonucleotide-immobilized 27-MHz quartz crystal microbal-ance," Anal. Chem., Apr. 1998, 70(7), 1288-1296.

Ouldridge et al., "DNA hybridization kinetics: zippering, internal displacement and sequence dependence," Nucleic Acids Res., Oct. 2013, 41(19), 8886-8895.

Ping et al., "Quantifying the effect of ionic screening with protein-decorated graphene transistors," Biosens. Bioelectron., 2015, 89(Pt 1), 689-692.

Ping et al., "Scalable Production of High-Sensitivity, Label-Free DNA Biosensors Based on Back-Gated Graphene Field Effect Transistors," ACS Nano., Sep. 2016, 10(9), 8700-8704.

Pumera, Graphene in biosensing, MaterialsToday, vol. 14, Issues 7-8, Jul.-Aug. 2011, pp. 308-315.

SantaLucia, "A unified view of polymer, dumbbell, and oligonucle-otide DNA nearest-neighbor thermodynamics," Proc. Natl. Acad. Sci., Feb. 1998, 95(4), 1460-1465.

Sawyers, "The cancer biomarker problem," Nature, Apr. 2008, 452(7187), 548-552.

Tsourkas et al., "Hybridization kinetics and thermodynamics of molecular beacons," Nucleic Acids Res., Feb. 2003, 31(4), 1319-1330.

Wang et al., "Graphene sheets, polyaniline and AuNPs based DNA sensor for electrochemical determination of BCR/ABL fusion gene with functional hairpin probe", Biosens Bioelectron, 2014, 51, 201-207; Abstract p. 202-204.

(56) References Cited

OTHER PUBLICATIONS

Wolfe et al., "Sequence Design for a Test Tube of Interacting Nucleic Acid Strands," ACS Synth Biol., Oct. 2015, 4(10), 1086-1100.

Xu et al., "Electrophoretic and field-effect graphene for all-electrical DNA array technology," Nat. Commun., Sep. 2014, 5, 4866.

Xu et al., "Real-time reliable determination of binding kinetics of DNA hybridization using a multi-channel graphene biosensor," Nat. Commun., Mar. 2017, 8, 14902.

Yang et al., "A cascade amplification strategy of catalytic hairpin assembly and hybridization chain reaction for the sensitive fluorescent assay of the model protein carcinoembryonic antigen", Mikrochim Acta, Jan. 10, 2018, 185(2), 100, Abstract, p. 3.

Yin et al., "Programming biomolecular self-assembly pathways," Nature, Jan. 2008, 451(7176), 318-322.

Yin et al., "Real-time DNA detection using Pt nanoparticle-decorated reduced graphene oxide field-effect transistors," Nanoscale, Jan. 2012, 4(1), 293-297.

Zhang et al., "Nano-Bioelectronics," Chem. Rev., Jan. 2016, 116(1), 215-257.

* cited by examiner

L     1     2     3     4     5

GRAPHENE-ENABLED DNA BIOSENSORS WITH ENHANCED SENSITIVITY AND SPECIFICITY

CROSS-REFERENCE TO RELATED APPLICATIONS

This application is the National Stage Application of International Patent Application No. PCT/US2019/021367, filed Mar. 8, 2019, which claims priority to and the benefit of U.S. Patent Application No. 62/640,753 "Graphene-Enabled DNA Biosensors With Enhanced Specificity" (filed Mar. 9, 2018), the entireties of which applications are incorporated herein by reference for any and all purposes.

GOVERNMENT RIGHTS

This invention was made with government support under Contract No. EFRI 2-DARE 1542879 awarded by the National Science Foundation. The government has certain rights in the invention.

TECHNICAL FIELD

The disclosed technology relates to the field of semiconductors and to the field of hairpin-structured oligo- and polynucleotides.

BACKGROUND

Nanoelectronic devices, such as graphene or carbon nanotube devices, have shown great promise in detecting the presence of nucleic acids and other analytes in a sample. There is, however, a long-felt need for such devices that are capable of detecting relatively low concentrations of such analytes in a sample, as the presence of an analyte of interest can be comparatively low in the sample of interest.

SUMMARY

Provided here is, inter alia, a technology that overcomes traditional sensitivity limits of GFET sensors for nucleic acids and other molecular targets based on single stranded probe DNA or single stranded nucleic acid aptamers. The disclosed technology class is useful in detection of, e.g., amplicons in a system for quantitative DNA sequencing as well as detection of drugs or other targets (e.g., proteins, biomolecules, metals) for which an aptamer is available.

The disclosed GFET sensor design is a scalable fabrication process. It includes a hairpin-structured probe DNA and a triggered self-assembly pathway to enable target recycling and a chain reaction (e.g., via hybridization) to amplify the transduction signal and improve the LOD by a factor of 20,000 or more, depending on the incubation time.

Results obtained with the disclosed approach are in good agreement with a mass action kinetic model. Tests showed that hairpin probe DNA offered enhanced specificity against non-complementary DNA with a single base mismatch, and multiplexed detection using the GFET arrays was demonstrated. The disclosure herein provides high sensitivity nucleic acid testing independent of length constraints for the target DNA, which is significant for disease diagnosis in a realistic clinical setting.

In meeting the described long-felt needs, the present disclosure first provides detectors, comprising: a first portion of graphene; a first hairpin probe (H1) comprising a plurality of nucleotides, the first hairpin probe (H1) being linked to and being in electronic communication with the first portion of graphene, in its hairpin configuration, the first hairpin probe (H1) comprising (a) a bottom portion linked to the portion of graphene, (b) a paired portion (which paired portion can include an aptamer region), and (c) optionally an unpaired end portion, the first hairpin probe (H1) being configured to open upon binding (e.g., hybridization) by a target molecule (T) with the paired portion of the hairpin probe (H1), the binding giving rise to an H1-T complex having a paired region formed between the first hairpin probe (H1) and the target (T), the H1-T complex further having a protruding segment.

Also provided are methods, comprising contacting a detector according to the present disclosure to a sample comprising an amount of a target (T).

Further provided are methods, comprising: to a first hairpin probe (H1) comprising a plurality of nucleotides, the first hairpin probe (H1) being linked to and in electronic communication with the first portion of graphene, in its hairpin configuration, the first hairpin probe (H1) comprising (a) a bottom portion linked to the portion of graphene, (b) a paired portion (which can include an aptamer region), and (c) optionally an unpaired end portion, contacting the first hairpin probe (H1) with a target molecule (T) (which can be a nucleotide, for example, but can also be a protein or other molecule of interest) under such conditions that the target molecule (T) binds (e.g., via hybridization) with the paired portion of the hairpin probe (H1) and the first hairpin probe (H1) opens, the binding giving rise to an H1-T complex having a paired region formed between the first hairpin probe (H1) and the target (T), the H1-T complex further having a protruding segment.

Also provided are methods, comprising: to one or more first hairpin probes ($H1_i$=1 to n) each comprising a different plurality of nucleotides, the plurality of first hairpin probes being linked to and in electronic communication with a first portion of graphene, each of the plurality of first hairpin probes in its hairpin configuration comprising (a) a bottom portion linked to the portion of graphene, (b) a paired portion (which can include an aptamer region), and (c) optionally an unpaired end portion, contacting the plurality of first hairpin probes with one or more target molecules ($T_j$, j=1 to m) under such conditions that one or more of the target molecules binds with the paired portion of one or more first hairpin probes and the first hairpin probe opens, the binding giving rise to an $H1_i$-$T_j$ complex having a paired region formed between the first hairpin probe ($H1_i$) and the target ($T_j$), the H1i-Tj complex further having a protruding segment.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 6A provides I-V$_g$ characteristics for an array of 100 GFETs, showing excellent reproducibility FIG. 6B provides histograms and Gaussian fits (black lines) of Dirac voltages;

FIG. 6C provides hole mobility extracted from the curves in FIG. 6A—the narrow distributions of the Dirac point voltage (6.6±1.3 V) and carrier mobility (2700±700 cm$^2$/V-s) reflect the low level of doping induced by the fabrication process.

FIG. 11A provides a time course of the concentration of a DNA target oligomer; FIG. 11B provides a time course of the concentration of the hairpin H1 and target T product; FIG. 11C provides a time course of the concentration of hairpins H1, H2 and their product H1H2.

DETAILED DESCRIPTION OF ILLUSTRATIVE EMBODIMENTS

Figure 1A:
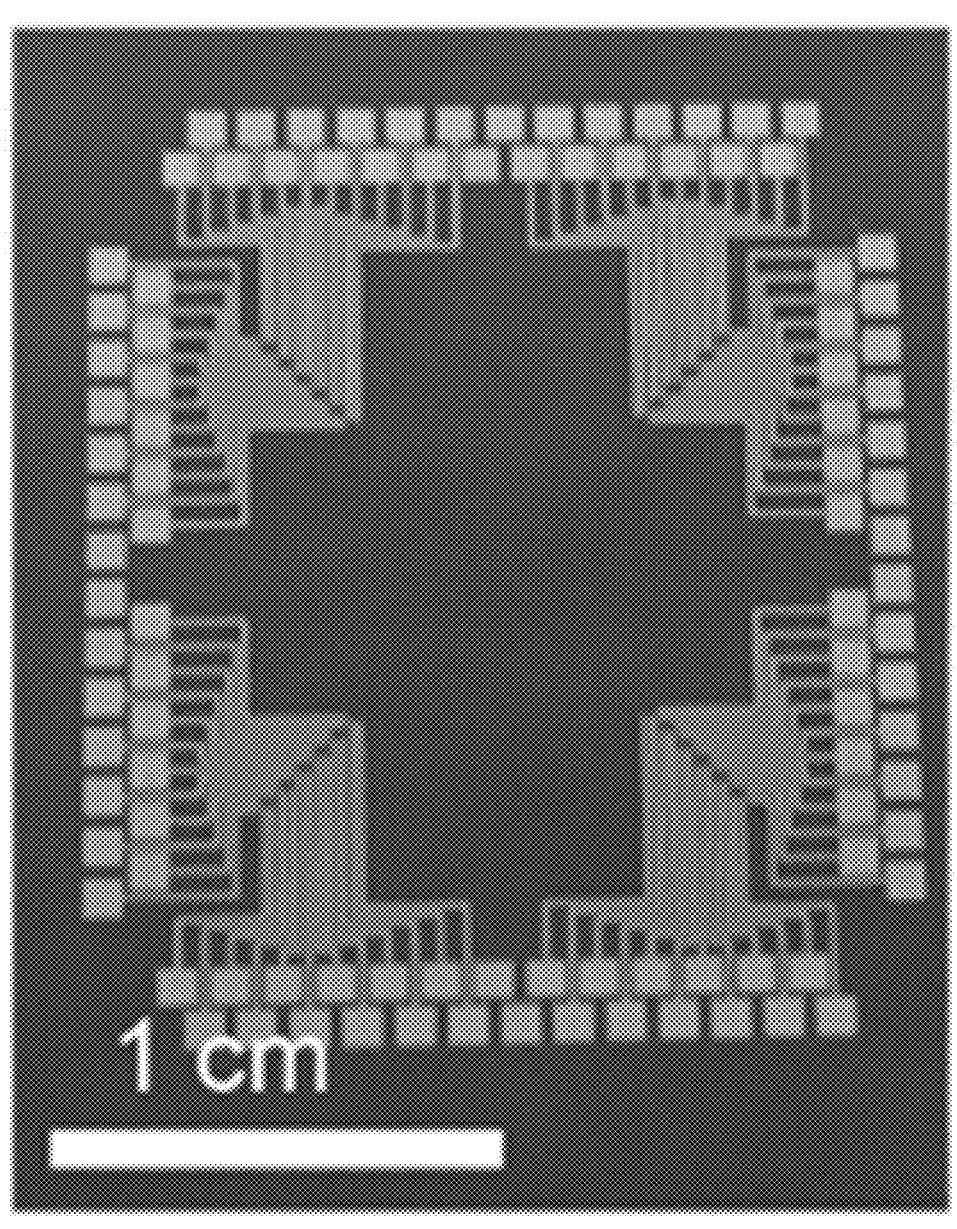
FIG. 1A provides an optical image of a graphene field-effect transistor (GFET) array fabricated on 250 nm $SiO_2$ chip.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order. Any documents cited herein are incorporated by reference in their entireties for any and all purposes.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range. In addition, the term "comprising" should be understood as having its standard, open-ended meaning, but also as encompassing "consisting" as well. For example, a device that comprises Part A and Part B may include parts in addition to Part A and Part B, but may also be formed only from Part A and Part B.

Label-free and multiplexed nucleic acid testing is of interest for genetic screening and clinical diagnosis, and nano-bioelectronics have shown great promise for this application. Graphene field effect transistors (GFETs) offer advantages of large surface-to-volume ratio, excellent biocompatibility, and high carrier mobility. GFETs can be readily functionalized with single-stranded probe DNA for detection of specific target oligonucleotides with complementary sequences.

By detecting the charge of targets (e.g., DNA) bound (e.g., hybridized) with the probe, GFETs typically offer a limit of detection (LOD) ranging from 1 fM to 100 pM. The broad range of sensitivities has been ascribed to the affinity-governed binding kinetics of target and probe DNA, which varies with the length of the complementary sequence: higher target-probe binding affinity and lower LOD are achieved for longer probe and target DNA oligomers.

For example, a LOD was reported of ~100 pM for 22-mer target DNA and and 1 fM LOD for 60-mer target DNA due to the stronger target-probe affinity. Achieving a low LOD for oligonucleotides without the constraint of target sequence length, e.g., sub-fM for a ~20-mer, is useful for the early diagnosis of various diseases by detecting biomarkers of oligonucleotides, such as cardiovascular disease and cancer.

Exemplary Results

Figure 5A:
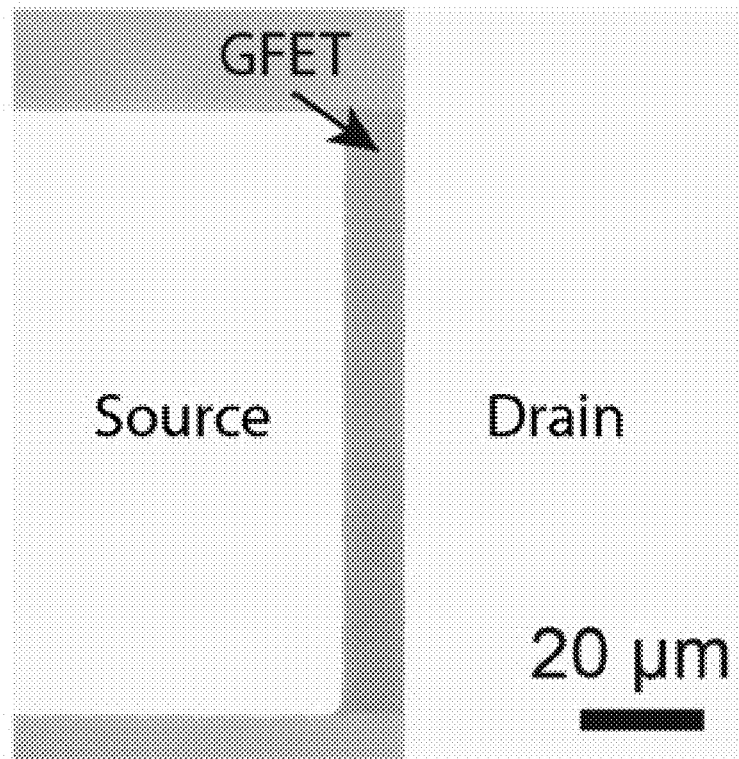
FIG. 5A provides an optical image of a GFET with channel dimensions 100 μm×10 μm. The lighter pink region is the oxidized silicon substrate, and the darker pink region is the graphene channel.
Figure 5B:
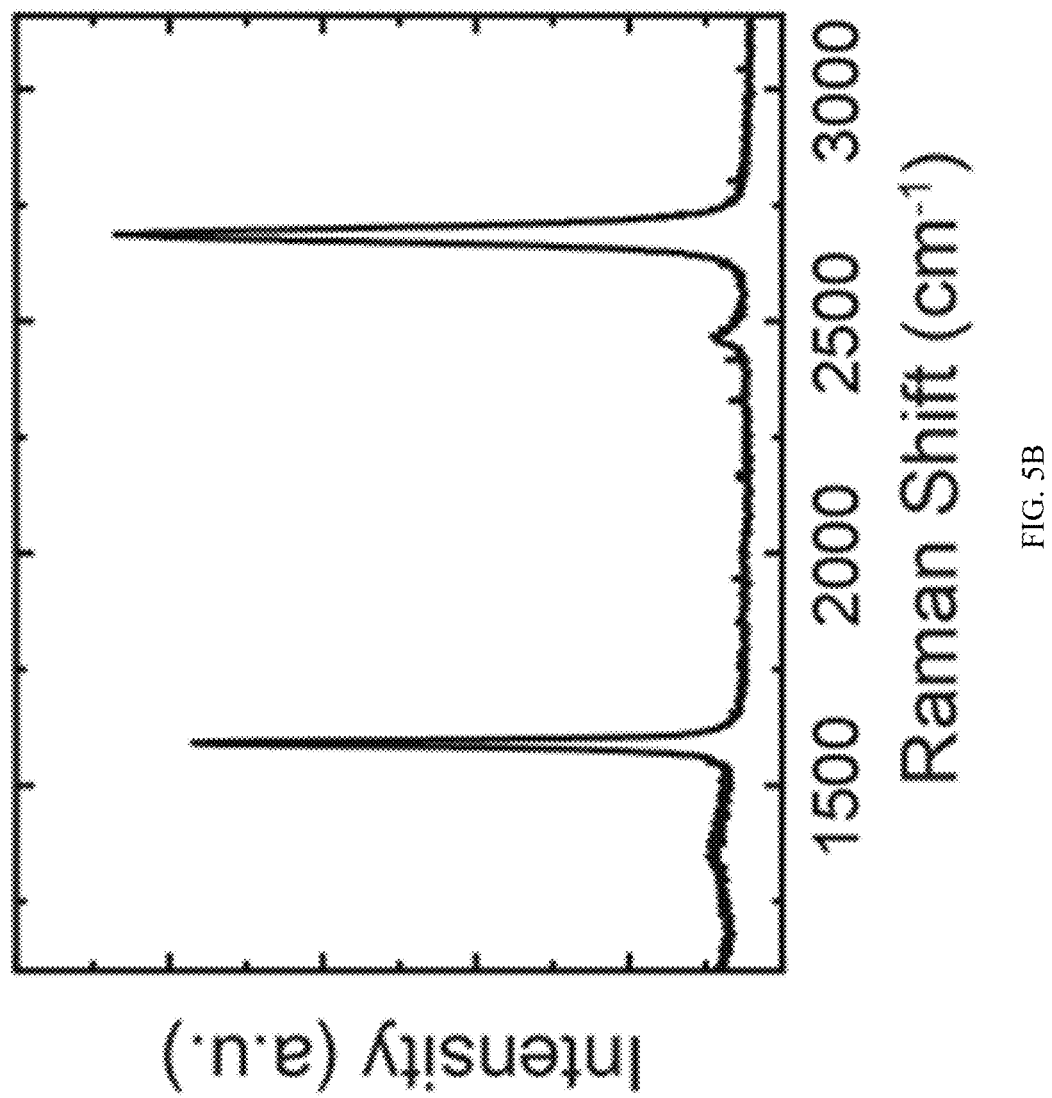
FIG. 5B provides Raman spectrum of a GFET after the photolithographic processing. The GFETs were of high quality, showing a 2D band at ~2689 cm$^{-1}$ that could be fit with a single Lorentzian with a full-width at half-maximum of ~31 cm$^{-1}$. The intensity of the D band (~1346 cm$^{-1}$) is negligible with an $I_D/I_G$ ratio of less than 0.05, as expected for high quality graphene. The low defect level shows the effectiveness of the bilayer photoresist process and annealing protocol, which together lead to reduced residual photoresist.
Figure 6A:
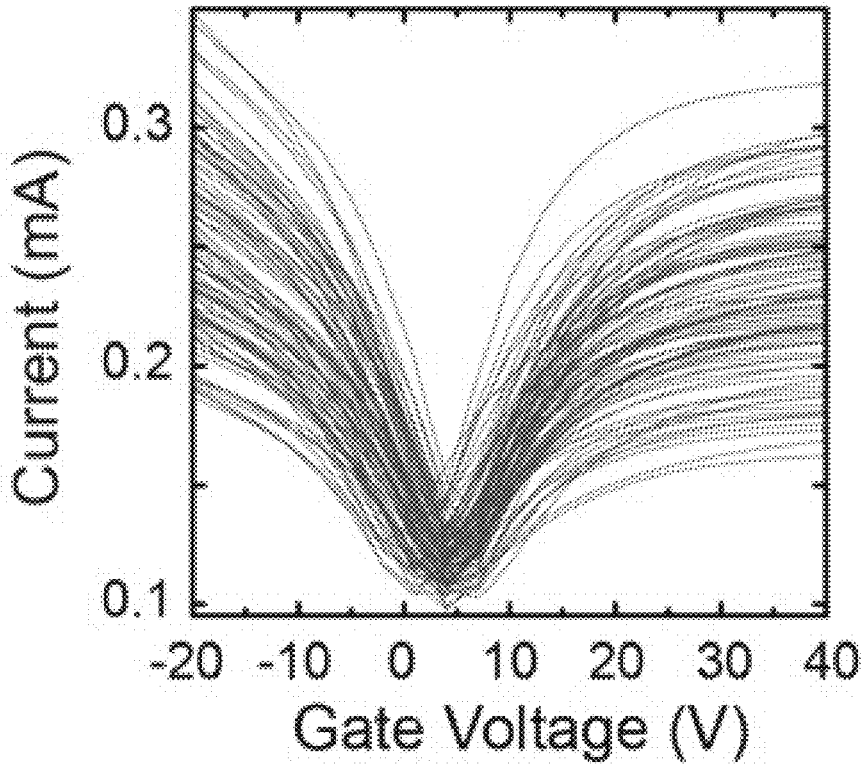
FIGS. 6A-6C provide full electronic characterization of 100 devices in a GFET array.
Figure 6B:
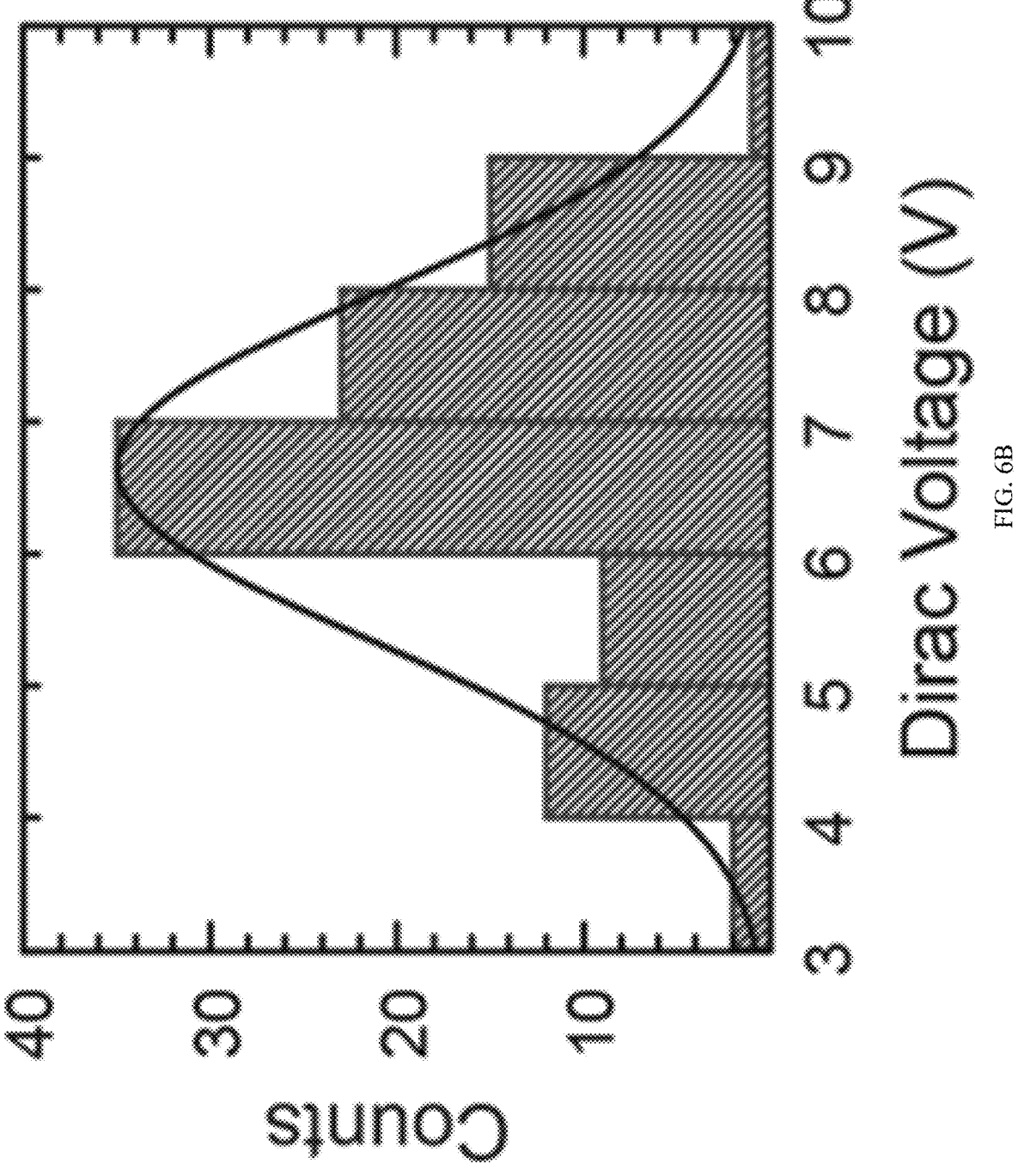
Figure 6C:
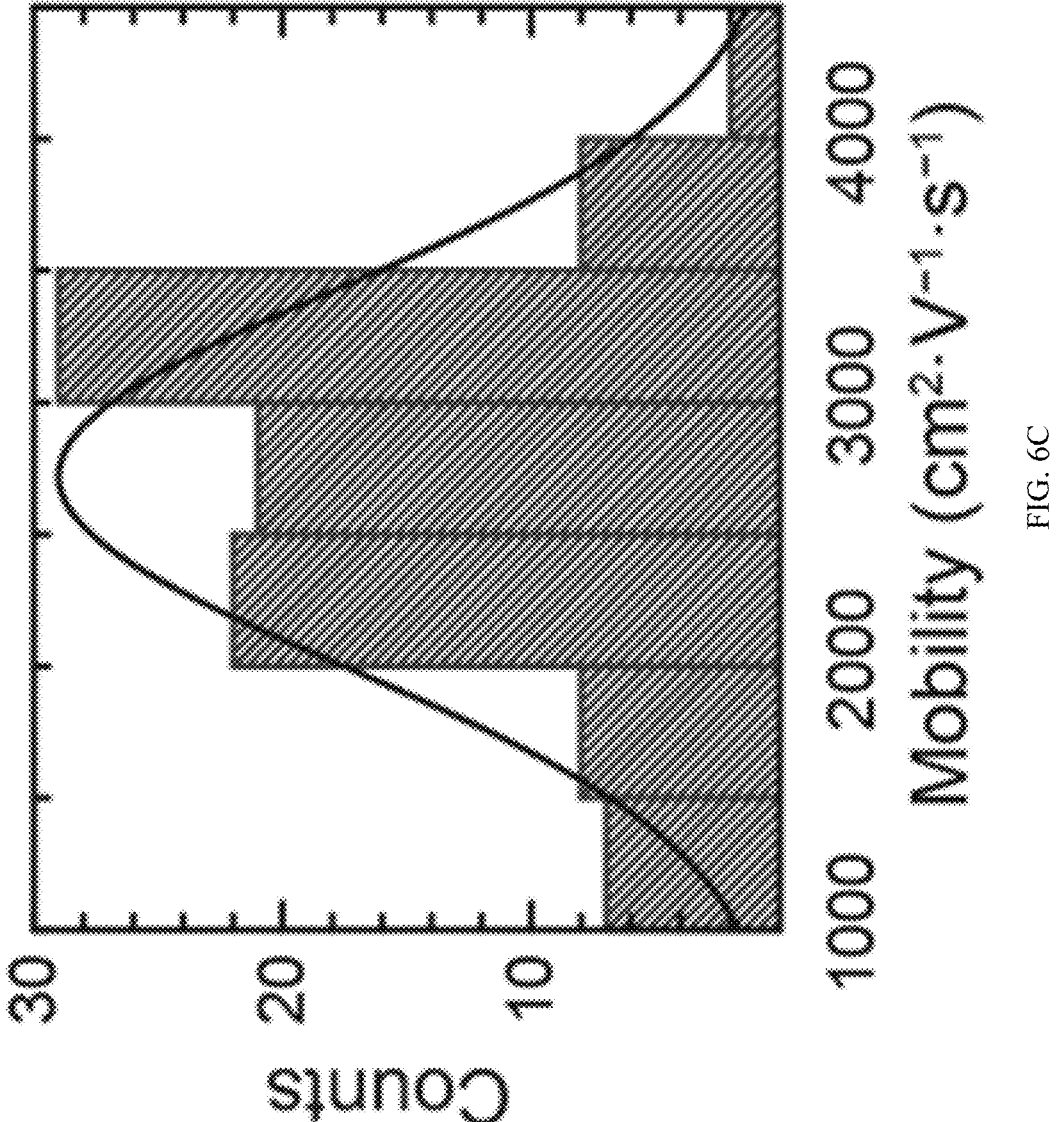

FIG. 1a is an optical image of a GFET array fabricated using a scalable photolithography process described herein. Briefly, large-area graphene (10 cm×15 cm) was synthesized on Cu foil by low-pressure chemical vapor deposition and transferred onto a Si/SiO$_2$ substrate with previously fabricated Cr/Au electrodes. GFET channels were defined using an optimized bilayer photolithographic process and oxygen plasma etching. After processing, the GFET arrays were annealed in a H2/Ar atmosphere at 225° C. to remove resist residues. The GFETs were of high quality as assessed by Raman spectroscopy (FIG. 5). As shown in FIG. 6, the current-gate voltage characteristics showed good device-todevice uniformity, a narrow distribution of the Dirac point (6.6±1.3 V), and high carrier mobility (2700±700 cm$^2$/V-s).

Figure 1B:
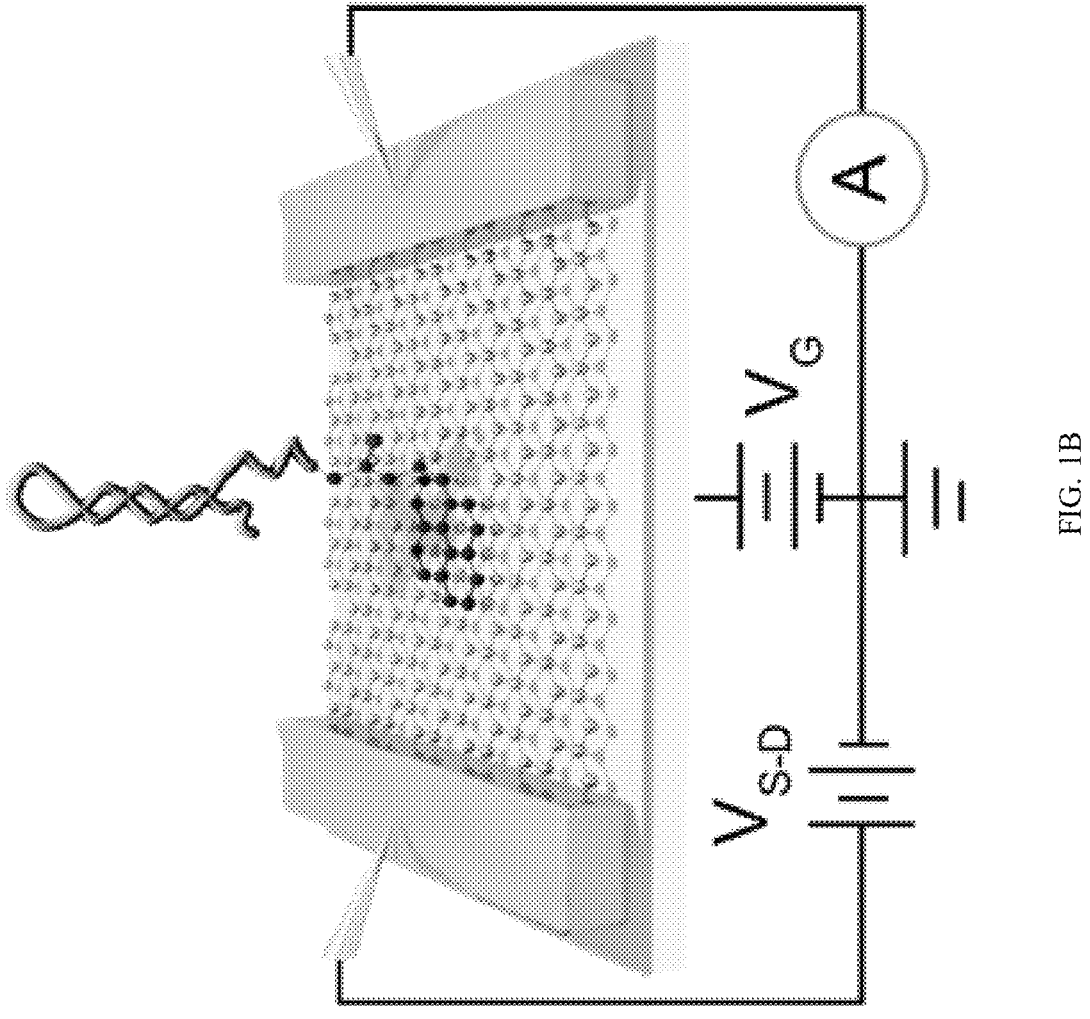
FIG. 1B provides a schematic of hairpin probe DNA bound to a back-gated GFET using a pyrene linker (purple)
Figure 7:
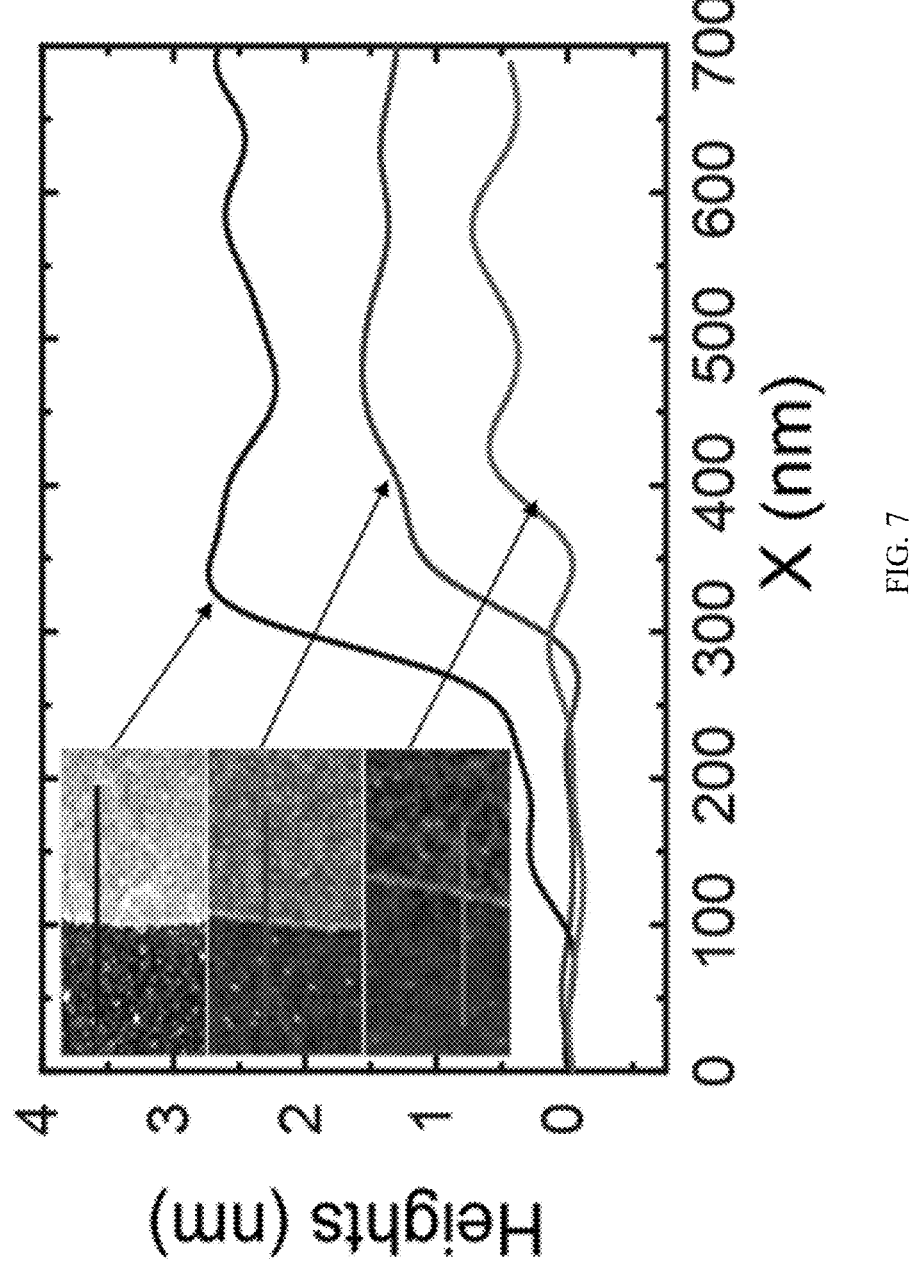
FIG. 7. Line scan profiles for an as-prepared GFET (green line), GFET functionalized with PBASE (red line) and GFET immobilized with aminated hairpin probe DNA (black line). Inset: AFM images with scan lines indicated. The as annealed GFET had a thickness of ~0.5 nm (green line). The PBASE functionalization step led to a ~0.7 nm height increase, consistent with the formation of a self-assembled monolayer of PBASE on the graphene surface. There is an additional ~1.1 nm height increase after immobilization of the hairpin probe DNA, which is in agreement with its molecular size (56-mer in total).

The GFETs were functionalized by incubation in a solution of PBASE in N,N-dimethylformamide (DMF), followed by incubation in an aqueous solution of aminated hairpin probe DNA (FIG. 1b). After functionalization, the probe DNA layer images as a nearly uniform brush in AFM, suggesting a high density of probe DNA immobilized on the GFET surface (FIG. 7).

The I-V$_g$ characteristics for a GFET array were measured after each functionalization step. Immobilization of probe DNA led to an increase in the Dirac voltage ($\Delta V_D$=71.3±6.0 V), which was explained quantitatively by assuming chemical gating of 56 elementary charges per probe oligomer, with a probe DNA density of ~1.1×10$^3$/μm$^2$.

Figure 2:
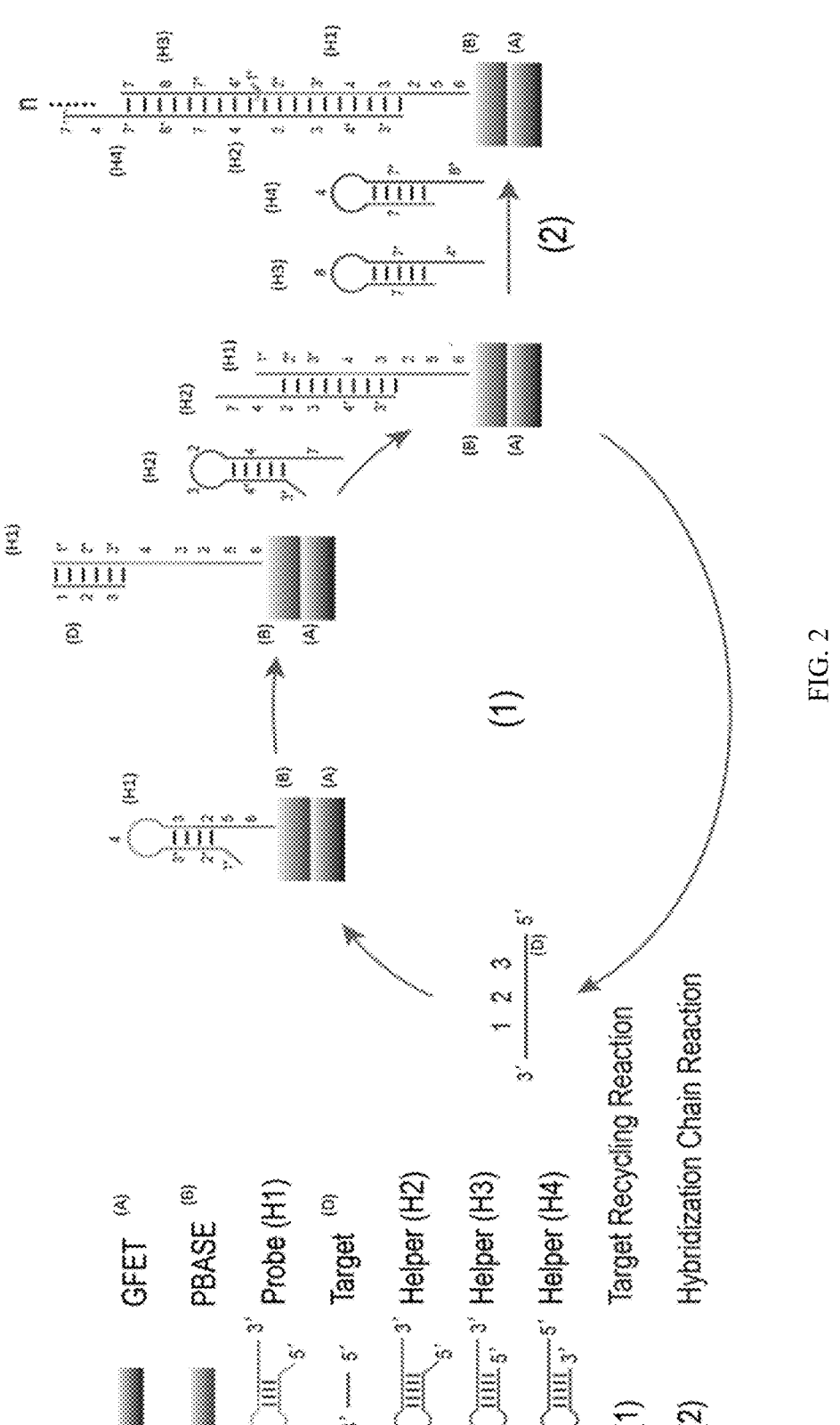
FIG. 2 provides a schematic showing the principle of the trigged self-assembly amplification for DNA detection on GFET. The GFET was functionalized by hairpin probe DNA H1 through the PBASE linker. The target DNA (T) opens the hairpin probe to form the complex H1·T. T is then displaced by helper DNA H2 through the toehold-mediated strand displacement reaction, leading to the formation of the H1·H2 complex and enabling target recycling. A hybridization chain reaction (HCR) was triggered by H1·H2 in the presence of two additional helper DNAs, H3 and H4. Amplified HCR products are then detected through, e.g., a change in signal, e.g., a shift of the GFET Dirac voltage.
Figure 10:
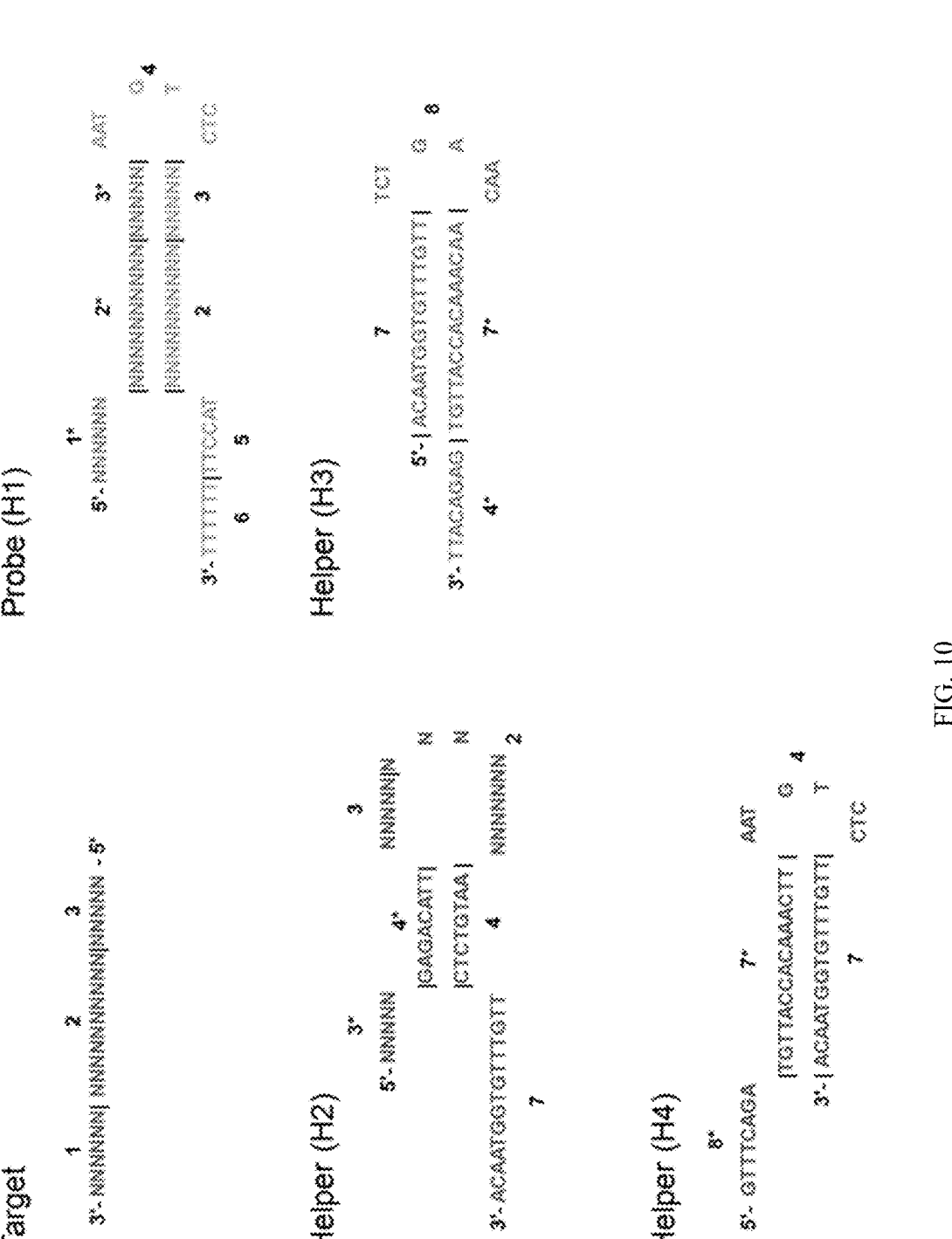
FIG. 10. Secondary structures and sequences design of DNAs for self-assembly amplification. The DNA sequences are presented both as secondary structure schematics and as text sequences annotated with segment names. The principle of hairpin DNAs in the reactions of assembly and disassembly was described before. Based on this principle, four hairpin DNAs were designed for ultrasensitive detection of Target DNA. The sequences of hairpin DNAs are described in terms of numbered domains and each number-labeled segment represents a short fragment (5-15 nucleotides) of DNAs. Asterisks denote complementarity. Once the segments 1, 2 and 3, which are depicted with letter N, in target DNA are determined, the complementary segments in probe H1 and H2 can be fixed. In order to avoid alternative folding, the UNAFold Web Server (unafold.ma.albany.edu) was used to design the other segments. A "TTTTTT" tail in the 3' end of H1 was designed to reduce the steric hindrance during the reaction of H1 and Target DNA. Notably, these four hairpin DNAs can be universally used for amplification of any short DNA or RNA by changing the sequences of segments 1, 2, 3, 1*, 2* and 3*, which provides a high sensitivity for detections of trace amount of target DNAs or RNAs.
Figure 11A:
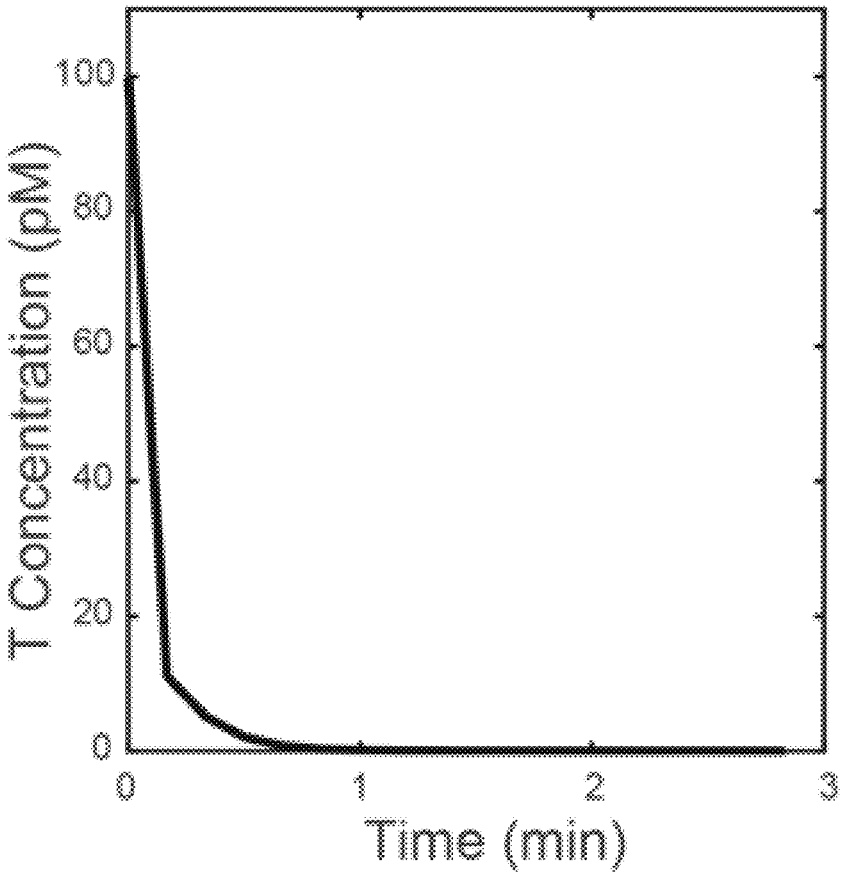
FIGS. 11A-11C provide examples of model kinetics.
Figure 11B:
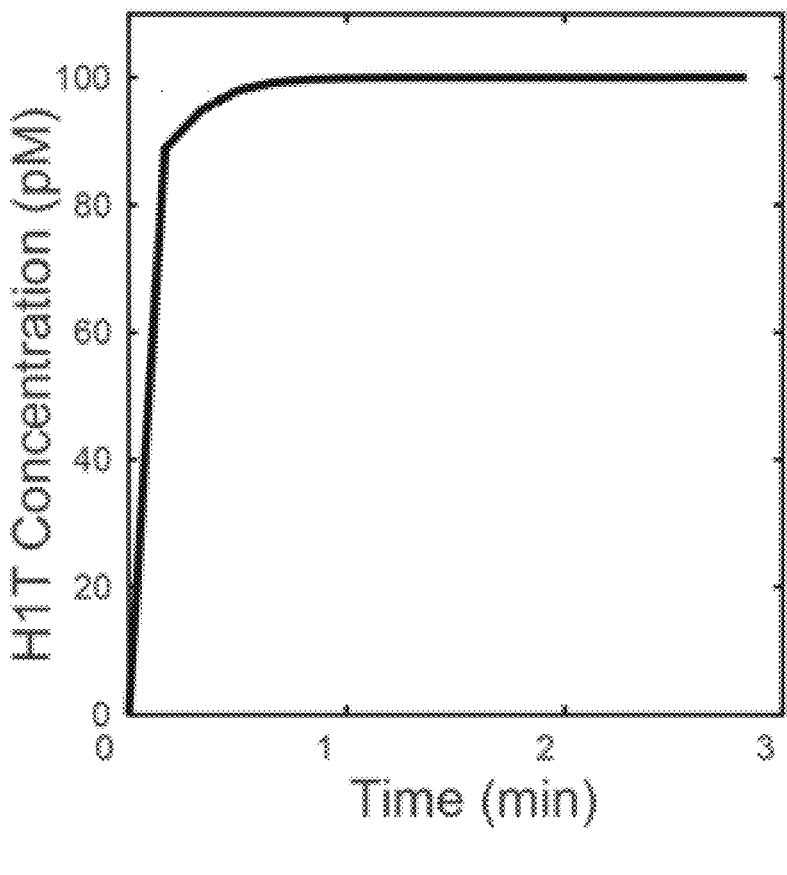
Figure 11C:
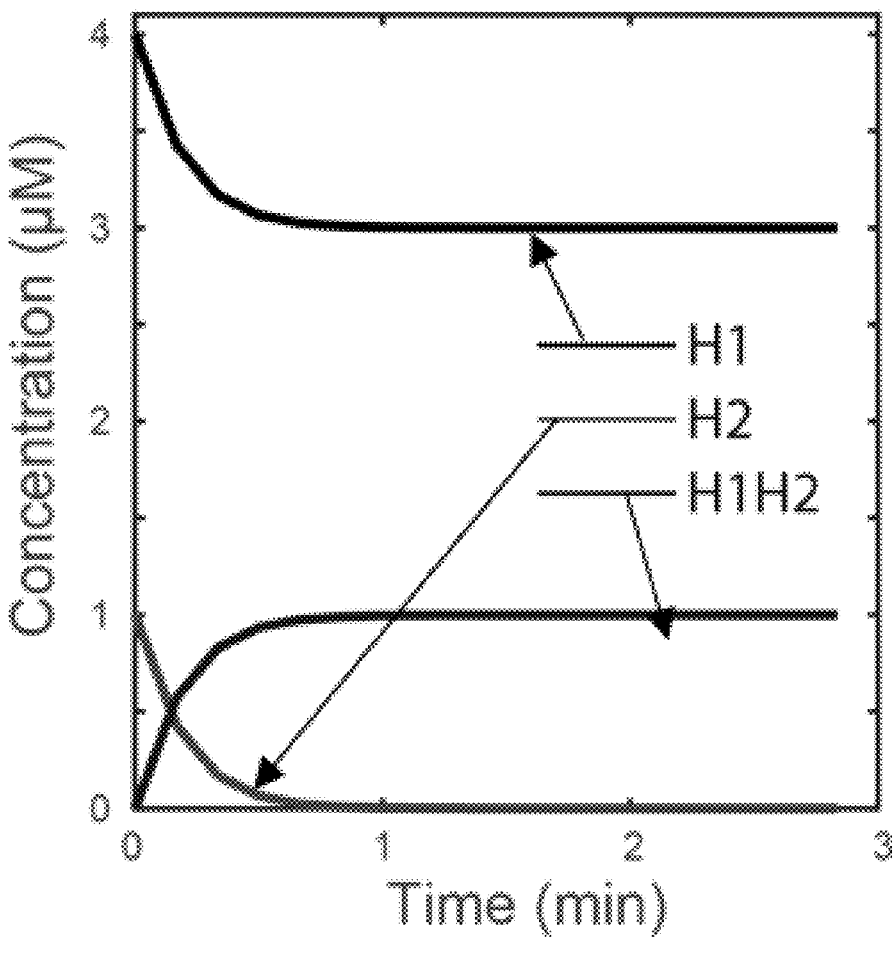

FIG. 2 illustrates the operating principle of detection based on target recycling and self-assembly signal amplification. The probe DNA sequence was designed to form a secondary hairpin structure after being annealed by gradually cooling from 95° C. to room temperature. The hairpin probe DNA was metastable and could be specifically opened by target DNA to trigger a self-assembly reaction. A detailed description and DNA designs can be found herein, e.g., at FIG. 10.

The GFET sensor, functionalized with the hairpin probe DNA (H1), was exposed to a mixture of target DNA (T) and three helper DNAs (H2, H3, H4). The target triggered the nucleation between H1 and T via base-pairing, mediating a branch migration that opened hairpin H1 to form a complex H1·T. The protruding segment of H1·T bound to the toehold of hairpin H2 (segment 3*; see FIG. 3) to initiate the strand-displacement reaction to form the complex H1·H2 and release T. The dissociated T was recycled to trigger additional self-assembly cycles as described above.

It should be understood that although targets can be nucleotides, targets can also be proteins, drug molecules, chemical species, waterborne impurities (e.g., mercury), contaminants, biomolecules, and other species of interest. It should also be understood that a hairpin probe (e.g., H1 in FIG. 2) can include an aptamer region, e.g., in a paired portion of the hairpin probe. An aptamer region can be selected such that the aptamer binds to and is selective for one or more targets of interest.

Meanwhile, the protruding segment of H1·H2 (segments 4 and 7) nucleated with hairpin H3 and triggered the hybridization chain reaction (HCR) with H4. The presence of T can be circularly used to trigger HCR, leading to long nicked double-stranded polymers for the amplification of DNA products that can be detected by GFET through chemical gating. The effectiveness of the self-assembly amplification was confirmed by electrophoresis analysis (see FIG. 8), where a smear band was found due to the formation of H1·H2·H3·H4 complexes with higher molecular weights.

The scheme described above is universal for the detection of short DNA or RNA by changing the sequences of segments 1, 2, 3, 1*, 2* and 3*, and H1 and H2 can be correspondingly modified and used with universal H3 and H4 for the amplification.

It should be understood that FIG. 2 is illustrative only

Figure 1C:
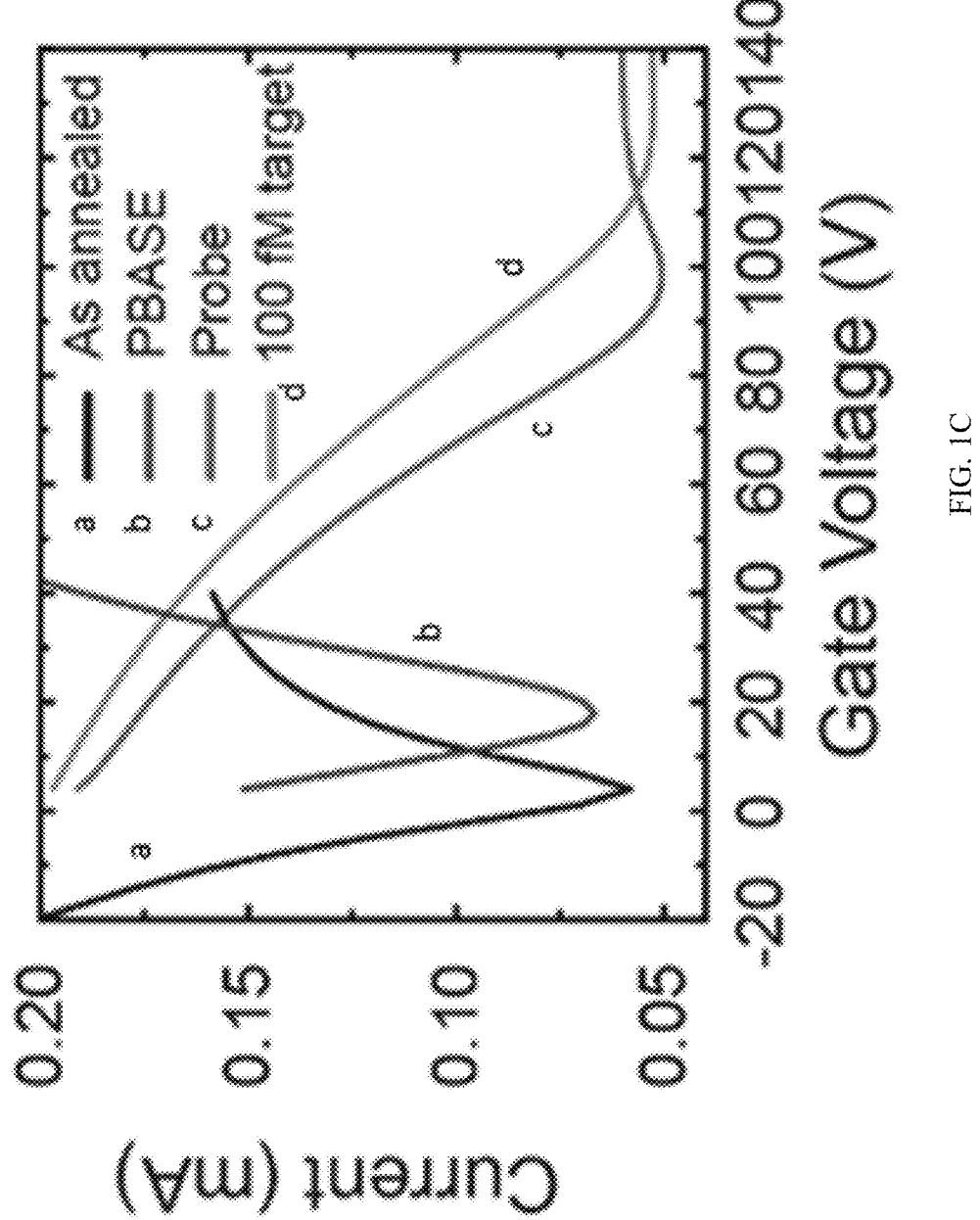
FIG. 1C provides a current-gate voltage curve evolution of GFET following different chemical treatment steps.
Figure 3A:
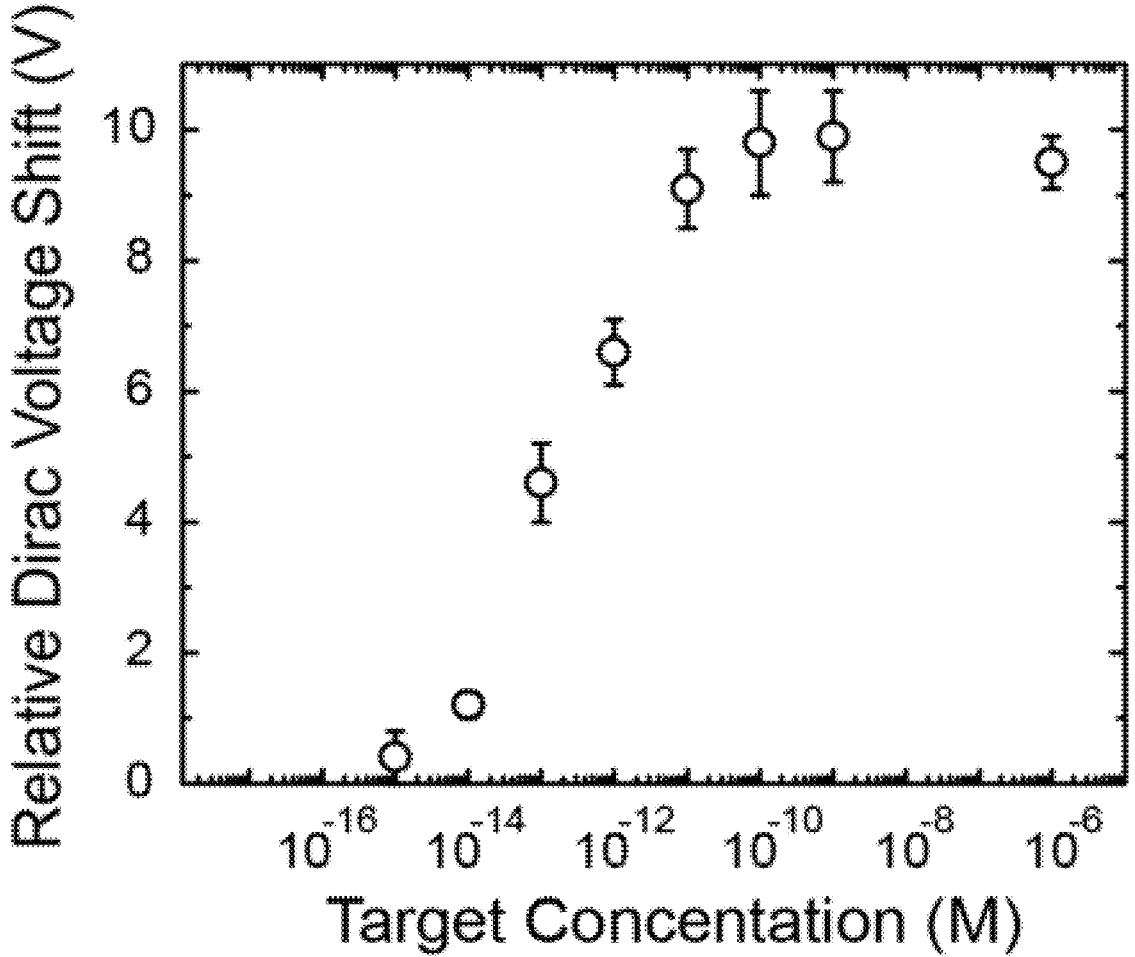
FIG. 3A provides sensor response as a function of target DNA concentrations. Error bars are standard deviation of the mean. The limit of detection for this exemplary, non-limiting device was <10 fM.

In illustrative sensing experiments, GFET biosensor arrays were tested against a mixture of a known concentration of the target DNA in the presence of three helper DNA H2, H3, and H4, all at a concentration of 1 μM, in 5×saline-sodium citrate (SSC) hybridization buffer, and the I-V$_g$ characteristics were measured in the dry state. In all cases a positive shift of the Dirac voltage was observed (FIGS. 1c and 3a). For a given target concentration, the sensor response is reported as $$\Delta V_D^{rel},$$

the Dirac voltage shift relative to the shift measured upon exposure to the DNA mixtures without target. FIG. 3a shows the GFET response for 1 hour incubation time.

$$\Delta V_D^{rel}$$

varied systematically with the target concentration, which is ascribed to the additional chemical gating of the GFET channel by the negatively charged DNA products by hybridization. The LOD for the 21-mer target is 5 fM, which is 20,000× lower than earlier reports using single-strand probe DNA.

To explore the dynamics of the self-assembly amplification in a non-limiting way, one may construct a mathematical model that reflects key biochemical reactions that connect the target DNA oligomer to the initiation of the amplification response mediated by the hairpins H1 and H2. The kinetic model is based on the assumption that the HCR reaction with H3 and H4 is non-reversible due to the high concentration of helper DNA species (1 µM), so the model does not consider reactions involving the helpers H3 and H4. Even in its simplicity, the model recapitulated the measured target DNA dose-response curve (FIG. 3c). The model also predicted that the experimental dose-response curve is a function of incubation time: at low target concentration (fM range), the Dirac voltage shift was predicted to grow if the experiments were run for longer periods of time (>1 hour) because the recycled target DNA would open additional H1 hairpins with time, increasing the number of H1·H2·H3·H4 complexes.

Figure 3B:
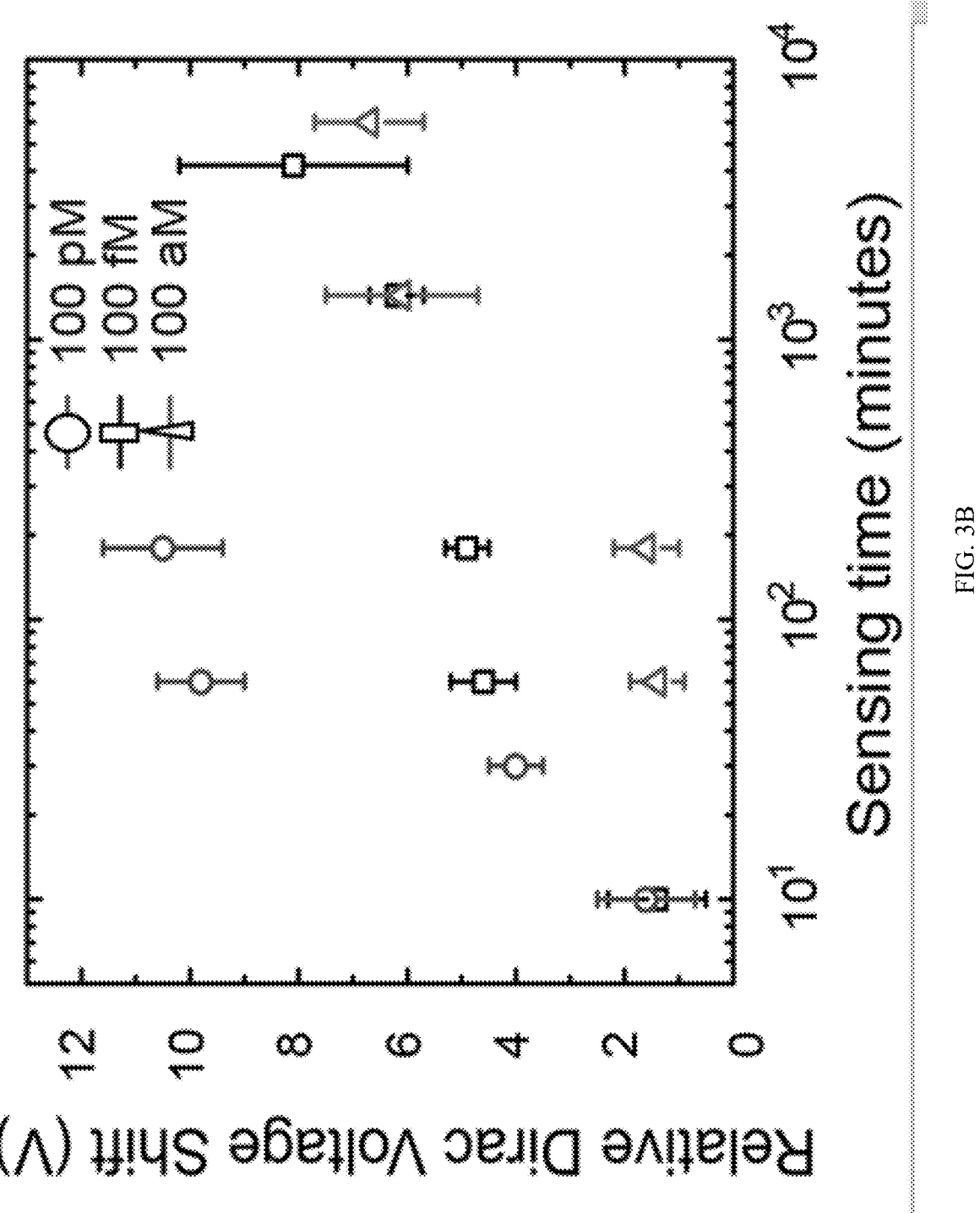
FIG. 3B provides a sensor response as a function of incubation time for different target concentrations.
Figure 3C:
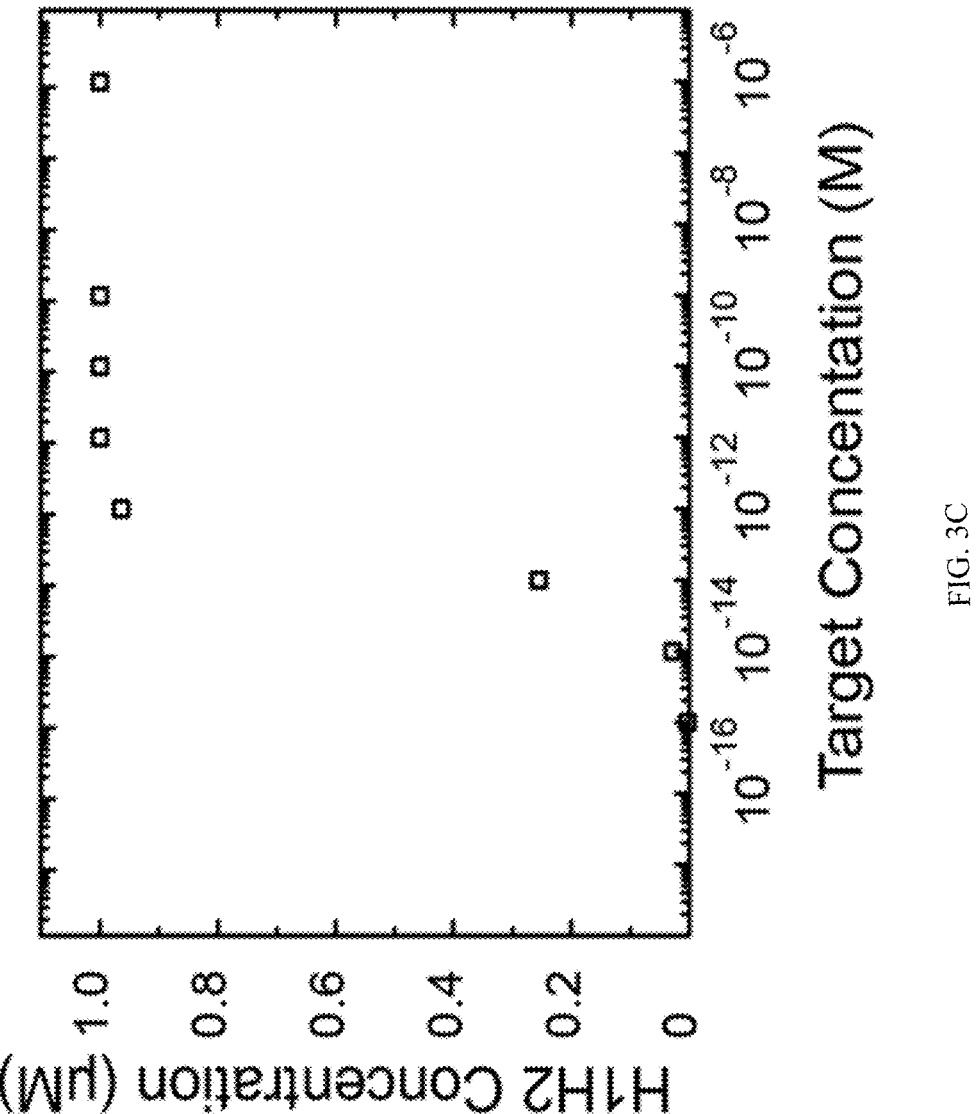
FIG. 3C provides simulation results of H1·H2 complex examined for different concentrations of target DNA shows good qualitative agreement with FIG. 3A.
Figure 3D:
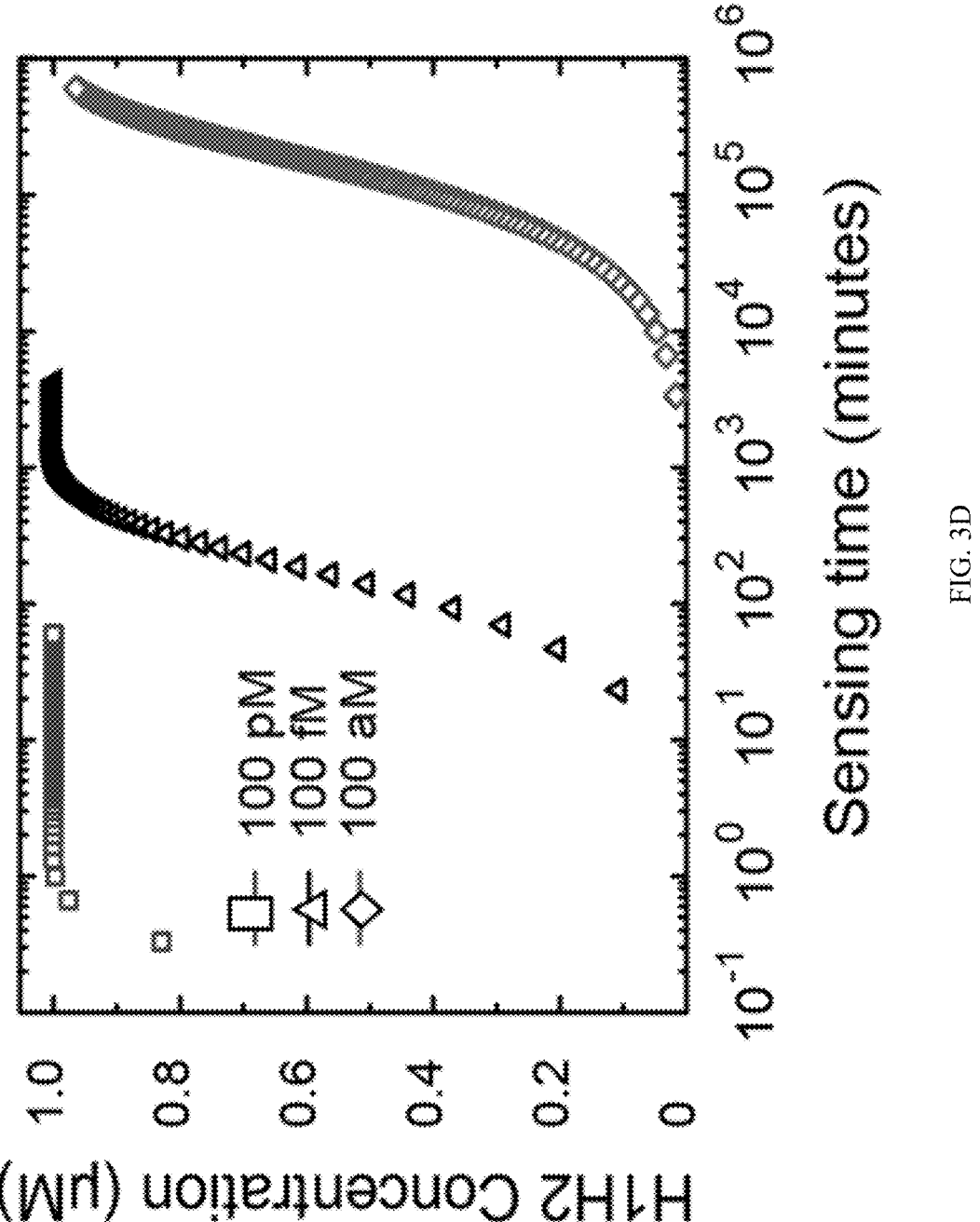
FIG. 3D provides simulation results of H1·H2 concentrations as a function of time with different target concentrations, showing trends similar to FIG. 3B.
Figure 4:
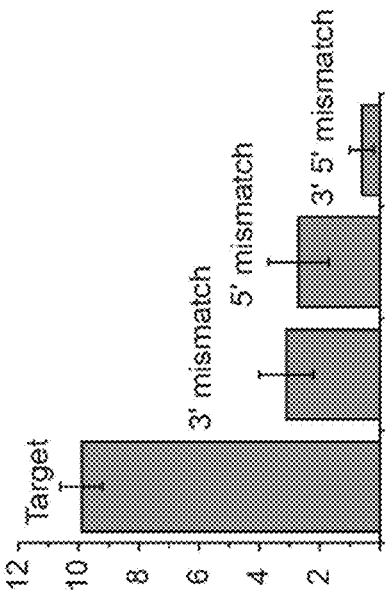
FIG. 4 provides biosensor response to positive and negative controls with (left panel) relative Dirac voltage shifts for various positive control experiments based upon concentrations of 1 μM for the target DNA and the specific helper DNAs and (right panel) relative Dirac voltage shifts for 10 nM target DNA and negative controls with base mismatches at the ends; detailed DNA sequence are listed in Table 1. Error bars are standard deviation of the mean. Helper DNAs were of 1 μM.
Figure 4:
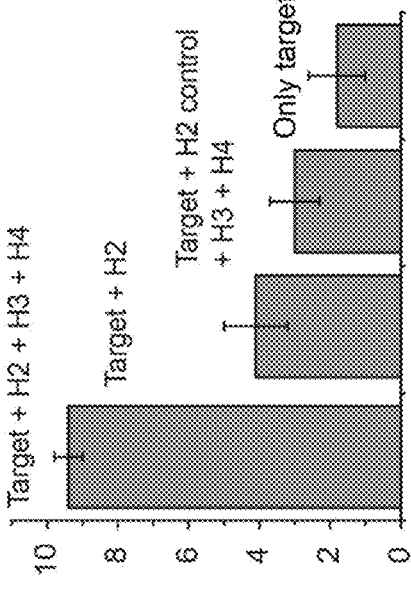
Figure 12:
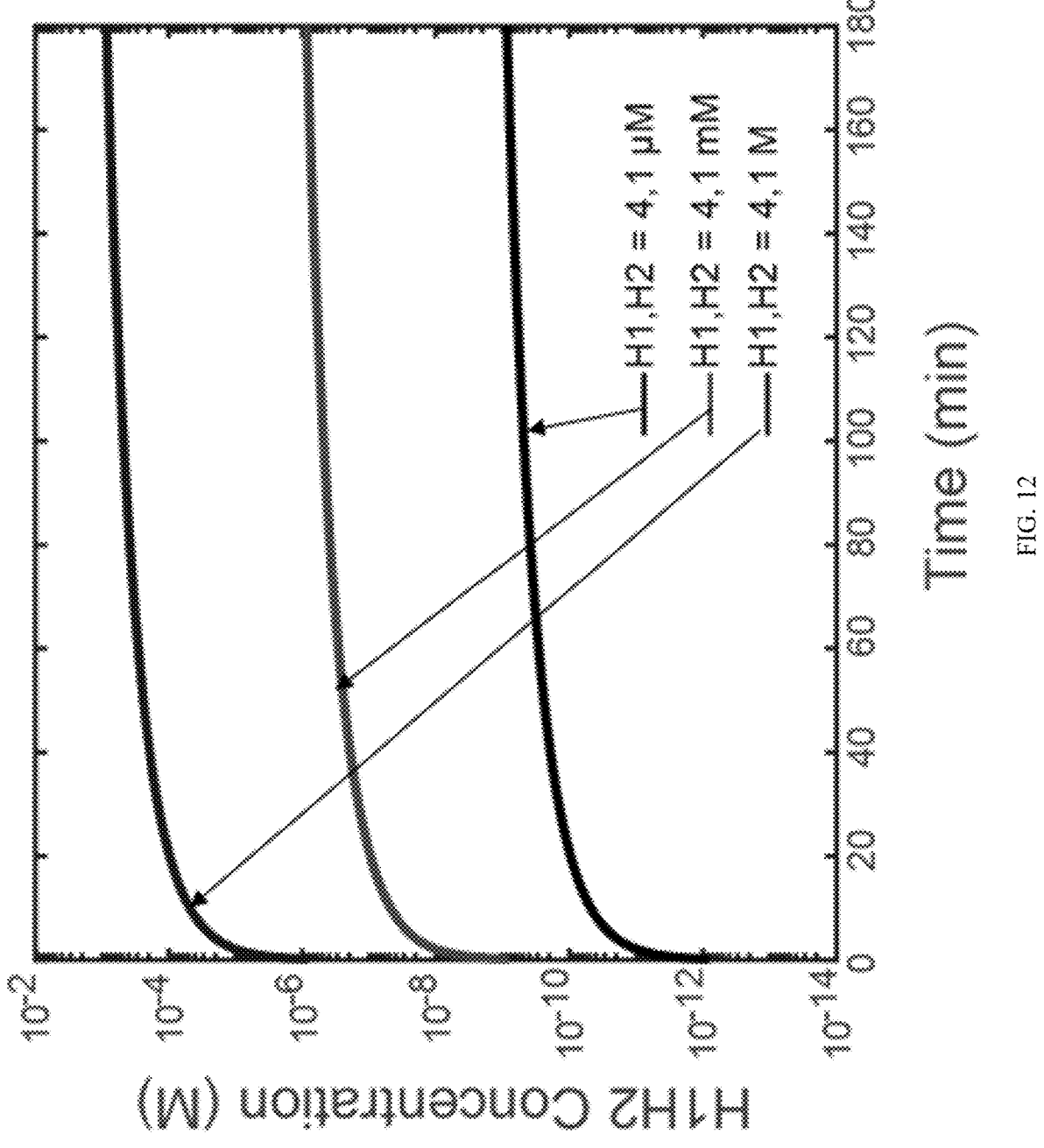
FIG. 12. H1·H2 complex concentration against sensing time for different initial H1, H2 concentrations based on the kinetic model, which predicts that increasing the initial concentration of H1 and H2 could lead to the acceleration of the reaction and shorter sensing time.

The model predictions were validated experimentally (FIG. 3b). Three target DNA concentrations were used (100 pM, 100 fM, 100 aM) with the same experimental conditions except that incubation time was prolonged to 100 hours instead of 1 hour. Biosensor responses rapidly saturated in less than 1 hour for a concentration of 100 pM. For lower concentrations (100 fM, 100 aM), the response increased more gradually over time. The model gave correct qualitative predictions for the temporal trajectories of the response to the target concentrations tested, although the kinetics of the model were accelerated compared to the experiment (compare the time axes in FIGS. 4b and 4d). As shown in FIG. 4b, the LOD for the disclosed approach is further decreased by 50× to 100 aM with a sensing time of ~15 hours. Reaction kinetics can be altered by optimizing the sensing parameters, e.g., H1, H2 concentration (FIG. 12) and incubation temperature, which offers the opportunity to tune the sensing time as needed to enable point-of-care detection.

Figure 8:
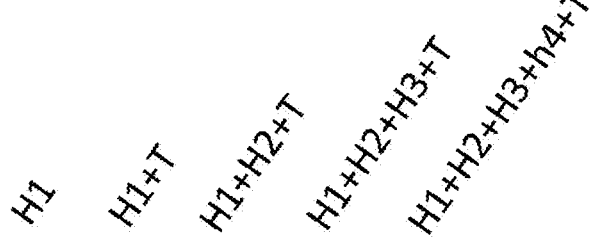
FIG. 8. Agarose gel electrophoresis results for the self-assembly amplification. The stock DNAs were pre-denatured at 95° C. for 5 minutes at 40 μM, followed by cooling to room temperature over 2.5 hours to form the hairpin structures before usage. The room temperature reactions were conducted in 25 μL 5×SSC buffer with each oligo-nucleotide at 4 μM concentration. Each lane of agarose gel electrophoresis shows the signal of the products by 2 hours reaction as indicated by the notes, lane L is the 25-500 bp DNA ladder (Life Technologies). The 3% agarose gel was prepared in 1×TBE buffer (90 mM Tris/89 mM boric acid/2.0 mM EDTA, pH 8.0). The gel was run at 110 V for 45 minutes, stained with 0.5 μg/mL ethidium bromide, and was visualized by UV light.
Figure 8:
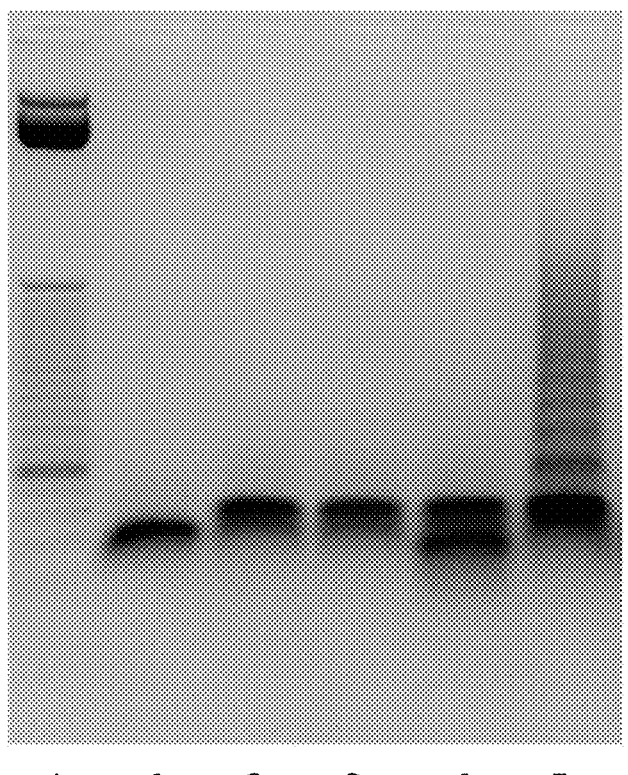
Figure 9:
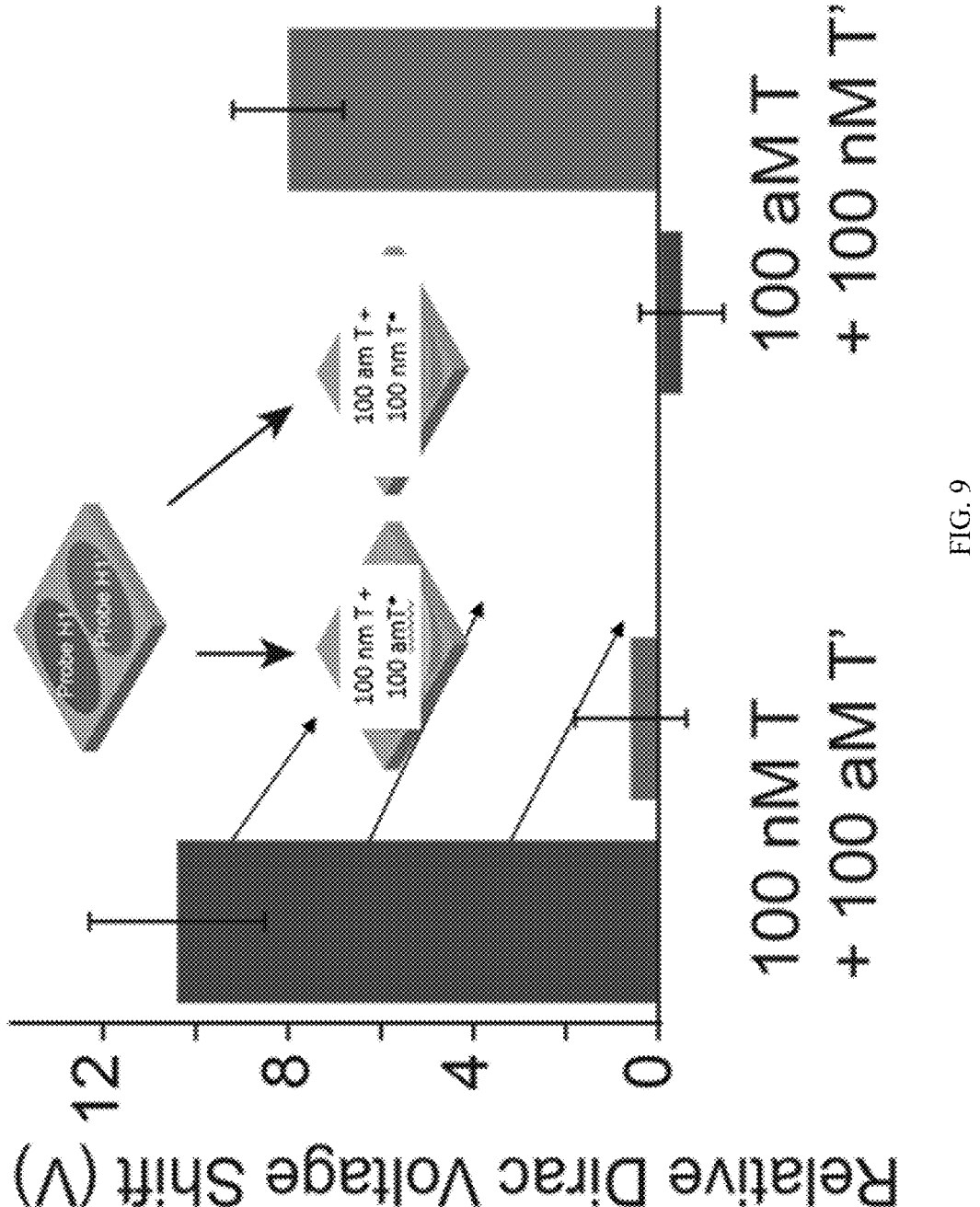
FIG. 9. Multiplexed measurement for mixtures containing two different DNA targets T and T'. The schematic shows a single sensor array with GFETs in the red and green regions functionalized with hairpin probes H1 and H1', respectively. The bar plot shows the array responses against two different target DNA mixtures: 1) 100 nM T+100 aM T' and 2) 100 aM T+100 nM T'. For each mixture, the appropriate output response is observed, establishing the multiplexing capability of the array.

To validate the effectiveness of detection based on target recycling and self-assembly amplification, the GFET arrays were tested against several positive controls. As shown in FIG. 4a, the mixture of target DNA (1 µM T) and helper DNAs (1 µM H2, 1 µM H3, 1 µM H4) gave the highest response of 9.5±0.4 V. For the positive control with target recycling but no HCR (only mixture of T+H2), the signal dropped to 4.2±0.9 V, consistent with the expectation that HCR leads to increased formation of DNA products, consistent with the electrophoresis test (FIG. 8). The sensor response further decreased to 3.1±0.7 V by using a random sequenced H2 to suppress the target recycling reaction, which is similar to the response for the control sample with T only (1.9±0.7 V).

The GFET arrays were then tested against various negative controls, all at a concentration of 10 nM, to confirm that the response reflected specific binding of the complementary target DNA. As seen from FIG. 3a, this 10 nM test concentration corresponded to a fully saturated sensor response for the T strand. As shown in FIG. 4b, the target DNA give the largest signal (9.9±0.7 V), while for target DNA with a single base mismatch at the 3' or 5' end, the responses were significantly smaller, 3.1±0.9 V and 2.7±1.0 V, respectively, which would correspond to a T concentration of 100 fM for the target DNA. This very strong rejection of binding for the single-base mismatch at the 3' or 5' end was improved relative to GFET DNA sensors based upon single-stranded probe DNA. The higher specificity may, without being bound to any particular theory, be attributed to the stem-and-loop structure of the hairpin probe DNA. The binding to the target disrupts the hairpin structure of the probe DNA and is less thermodynamically favorable than the binding of the target to the single-stranded probe DNA. The control oligomer with two mismatches at the 3' and 5' ends had a relative Dirac voltage shift of 0.6±0.4 V, essentially identical to the Dirac voltage shift for buffer.

Finally, demonstrated multiplexed detection of target DNAs T and T' with a GFET sensor array was demonstrated, through the use of site-specific functionalization using two different hairpin probe DNAs. The second set of probe DNA (H1') and helper DNA (H2') were redesigned according to the base sequence of the second target DNA (T') to trigger the self-assembly reaction in the presence of H3 and H4. As shown in FIG. 6, exposure of the DNA mixture (100 nM T, 100 aM T', 100 µM H2, 100 µM H3 and 100 µM H4 in 5×SSC buffer) leads to distinguishable response for the site-specifically functionalized GFET sensors (10.4±1.9 V for H1 site, versus 0.6±1.2 V for the H1' site). The multiplexed sensor array is therefore capable of quantifying concentrations of T and T' simultaneously in a single measurement, which is potentially valuable for use in a clinical setting.

CONCLUSIONS

Provided are manufacturable GFET nucleic acid sensors based on hairpin probe DNA designed to enable signal amplification by target recycling and a hybridization chain reaction. In one exemplary embodiment, based upon a 1 hour detection time, the limit of detection was ~5 fM for a 21-mer, an improvement of 20,000× over earlier reports based on complementary probe DNA. The limit of detection can be lowered to below 1 fM by extending the time, in agreement with a simplified kinetic model. The approach showed excellent specificity against single base mismatches at the 3' or 5' end, as expected due to the design characteristics of the hairpin probe, and simultaneous detection of multiple targets was also demonstrated. The disclosed approach offers a platform for DNA detection at a low concentration even for short DNA targets. The scalability and sensitivity of the GFET devices make them potentially applicable for disease diagnosis and label-free genetic diagnosis.

Materials and Methods

Graphene Synthesis

Graphene was synthesized in a low-pressure chemical vapor deposition system (OTF-1200X-4-C4-SL-UL, MTI Corp.). Cu foils (Alfa Aesar Item #46365) were cleaned with 5.4% $HNO_3$ for 40 seconds and two DI water baths for 2 min, and then thoroughly blown dry using $N_2$ gas. The reaction chamber was pumped to a base pressure of 50 mTorr. The Cu growth substrate was annealed at 1020° C. for 30 minutes with a gas flow of 500 sccm Ar and 80 sccm H2. Monolayer graphene was then grown using methane as a carbon source at a flow rate of 5 sccm for 5 mins and then 10 sccm for 15 mins with 80 sccm H2. The reactor was rapidly cooled to room temperature under a flow of 80 sccm H2 and 10 sccm $CH_4$.

GFET Sensor Array Fabrication

Photolithographic processing was used to define an electrode array for 100 back-gated graphene FETs on a highly p-doped Si wafer with a 250 nm thermal oxide layer. The contact metallization was 5 nm Cr/40 nm Au, deposited by thermal evaporation. Graphene was then transferred onto the metallized $SiO_2$/Si chip using the PMMA assisted "bubbling" transfer method.

Briefly, PMMA-coated graphene/Cu was slowly immersed into a 50 mM NaOH aqueous solution with a 20 V potential difference applied between the copper foil and the solution. PMMA-supported graphene was separated from the Cu foil by hydrogen gas bubbles formed at the Cu surface. After three deionized water baths (resistivity of 18.2 MΩ-cm), the PMMA/graphene film was transferred onto the metallized $SiO_2$/Si chip, followed by air drying and baking at 150° C. for 3 minutes.

After removal of PMMA by immersion in acetone overnight, the chips were spin coated with a photoresist bilayer of PMGI (MicroChem Corp.) and S1813 (Shipley). Graphene channels were defined using photolithography and oxygen plasma etching (Pressure: 1.25 Torr, Power: 50 W, Duration: 35 seconds). The photoresist residue on graphene channels was removed by a N-Methyl Pyrrolidinone (NMP) based stripper (NANO™ Remover PG, MicroChem Corp.), acetone and IPA to obtain the array of 100 FETs. Finally, the array was annealed in $H_2$/Ar forming gas at 225° C. to reduce photoresist residues.

AFM Characterization

An atomic force microscope (AFM, Icon Bruker) equipped with a probe with a tip radius of <10 nm (TAP300Al-G, Budgetsensors) was used to evaluate the height increase for the PBASE functionalization and probe DNA immobilization.

PBASE Functionalization with Hairpin Probe DNA Immobilization and Testing Against Target or Control Solutions GFET sensors were soaked in a 0.2 mM PBASE (Sigma-Aldrich) in DMF for 20 h and then washed thoroughly with DMF, IPA, and DI water for 3 min each. The hairpin structure of the probe DNA was formed by heating the probe DNA at 95° C. for 5 minutes, allowed by gradual cooling to room temperature before use. GFET sensors were then incubated in 1 μM aqueous solution of hairpin probe DNA (sequence is listed in Table 1) in DI water for 3 hours in a humid atmosphere to suppress the evaporation of the DNA solution. This was followed by washing with two DI water baths (2 min each) and drying with $N_2$ gas. After I-$V_g$ measurement, the probe DNA-immobilized GFET devices were immersed in 200 μL of DNA mixture with known concentrations of target and helper DNA (1 μM for H2, H3 and H4, respectively) for 1 hour to allow for DNA hybridization. The devices were washed with two DI water baths, followed by drying with $N_2$ gas before measurement of the electrical properties.

The GFETs I-$V_g$ characteristics were measured after each functionalization step. Self-assembly of the PBASE layer led to an increased Dirac voltage ($\Delta V_D$=18.8±1.5 V), which is explained by assuming that NHS groups are hydrolyzed into carboxyl groups, which deprotonate and acquire a negative charge. Functionalization with PBASE also led to decreased hole carrier mobility to $\mu$=1070±200 $cm^2$/V-s, Immobilization of probe DNA led to a further increase in the Dirac voltage ($\Delta V_D$=71.3±6.0 V), corresponding to a hole carrier density of of $\sim 6 \times 10^{12}$ $cm^{-2}$ induced by the hairpin probe DNA. This is explained quantitatively by assuming chemical gating of 56 negative charges for each probe oligomer, so the observed Dirac voltage increase corresponds to a probe DNA density of $\sim 1.1 \times 10^3$/$\mu m^2$. This high density of immobilized probe DNA is consistent with the AFM images in FIG. 7, where individual probe DNA molecules are not resolved.

Design of Hairpin Structures

The target triggered self-assembly amplification circuit was based on a combination of four-hairpin DNA. FIG. 7 depicts the design of hairpin structures. The sequence of hairpin structures is described in terms of numbered domains, each of which represents a short fragment (5-15 nt) of DNA sequence. Numbered domains marked with * are complementary to the corresponding unmarked numbered domains. The length of toehold, stem, loop and target regions were chosen based on kinetic and thermodynamic considerations.

By using the UNAFold web server (unafold.rna.albany.edu), one can find that the target triggered amplification is sensitive to short DNA or RNA. Provided here are hairpins that maximize the free energy benefit per polymerization step while retaining hairpin metastability in these conditions. The four hairpin structures do not necessarily initially interact with each other.

Triggered Self-Assembly HCR Amplification

After immobilization of hairpin probe DNA H1 on GFETs, the target DNA with a known concentration (100 aM to 1 μM) and three helper DNAs (H2, H3, H4) at a concentration of 1 μM were introduced in an aqueous solution mixture with 5×SSC buffer. The four hairpin species, H1 (Probe), H2 (Helper), H3 (Helper) and H4 (Helper), coexist in metastable state in the absence of T (target). Exposure of target triggers the nucleation of H1 and T via base-pairing to the single-stranded toehold "1*" of T (FIG. 3a), mediating a branch migration that opens the hairpin H1 to form a complex H1·T and release a single-stranded segment "3 and 4" (FIG. 3a).

H1T complex then nucleates with hairpin H2 by means of base-pairing to toehold "3*", mediating a branch migration that opens the hairpin to form the complex H1·T·H2, which is inherently unstable. T then dissociates from the complex H1·T·H2, leaving a stable H1·H2 duplex with a protruding segment "4 and 7". The dissociated T is recycled into the DNA mixture, nucleates with a new H1 and triggers the same circuit as described above.

The protruding segment of H1·H2 nucleates with hairpin H3 via base-pairing to single-stranded toehold "4*", mediating a branch migration that opens the hairpin H3 and forms a complex H1·H2·H3 releasing of single-stranded segment "8 and 7". This complex nucleates with hairpin H4 by means of base-pairing to toehold "8*", mediating a branch migration that opens the hairpin to form complex H1·H2·H3·H4 releasing of single-stranded segment "4 and 7". Thus, the initiator sequence is regenerated, providing the basis for a hybridization chain reaction of alternating H3 and H4 polymerization steps.

In this amplification system, target DNA can be circularly used to trigger HCR amplification, which results in the generation of numerous long nicked double-stranded amplification polymers. Due to the target recycling and self-assembly amplification nature, the presence of low concentration of target is expected to generate a large number of annealed H1·H2·H3·H4 complexes, which can potentially result in a significant change of Dirac voltage for GFET detection of trace amount of target DNAs and RNAs.

Electrical Measurement and Evaluation

Electrical measurements were performed under ambient conditions in a probe station equipped with a probe card that is capable of measuring the 100 devices simultaneously. Current-gate voltage ($I$-$V_g$) measurements were carried out using a Keithley 2400 sourcemeter, with a bias voltage of 0.1V. The gate voltage was applied using a Keithley 6487 voltage source. Dirac point voltage and hole carrier mobility were extracted by fitting the hole branch of the $\sigma$-$V_g$ curve to the equation:

$$\sigma^{-1}(V_g) = [\mu c_g (V_D - V_g)]^{-1} + \sigma_s^{-1}$$

where $c_g$ is the gate capacitance per unit area for the 250 nm thick $SiO_2$ (11.5 nF/cm$^2$), $\mu$ is the hole carrier mobility, $V_D$ is the Dirac voltage, and $\sigma_s$ is the saturation conductivity as $V_g \rightarrow -\infty$.

Kinetic Model

A computational model was constructed that simulates the amplification response that enables the detection of a DNA oligomer. Specifically, the model reflects key biochemical reactions that connect the target DNA oligomer sequence to initiation of the amplification response mediated by the Hairpin H1 and H2. The model is based on mass action kinetics and comprises 5 coupled ordinary differential equations (ODEs), each of which expresses the rate of change in the concentration of a biochemical species:

$$\frac{dH1}{dt} = -k1_{on} \times H1 \times T + k1_{off} \times H1T \tag{1}$$

$$\frac{dT}{dt} = \\ -k1_{on} \times H1 \times T + k1_{off} \times H1T + k2_{on} \times H1T \times H2 - k2_{off} \times H1H2 \tag{2}$$

$$\frac{dH1T}{dt} = \\ k1_{on} \times H1 \times T - k1_{off} \times H1T - k2_{on} \times H1T \times H2 + k2_{off} \times H1H2 \tag{3}$$

$$\frac{dH2}{dt} = -k2_{on} \times H1T \times H2 + k2_{off} \times H1H2 \tag{4}$$

$$\frac{dH1H2}{dt} = k2_{on} \times H1T \times H2 - k2_{off} \times H1H2 \tag{5}$$

The model's input is the target DNA oligomer concentration and its output is the concentration time course (i.e., kinetic trajectory) for each biochemical species considered. The initial concentrations of the Hairpin H1 and H2 are set to 4 μM and 1 μM, respectively. The model reactions and parameters representing the rates of different molecular and cellular processes, such as target DNA oligomer-Helper association/dissociation, are defined in Table 2. All computational analyses were performed in the software suite MATLAB R2017a (MathWorks, Natick, MA), and the ODEs were solved using the ODE15S solver with an absolute tolerance of 10$^{-15}$ μM and a relative tolerance of 10$^{-12}$.

Agarose Gel Electrophoresis

The target triggered self-assembly amplification was confirmed on a step-by-step basis using agarose gel electrophoresis (FIG. 5). Hairpin H1 reacts with target and leads to a band corresponding to the product of H1·T, which migrates slower than H1 in agarose gel. Complex of H1·T then reacts with hairpin H2 to produce a band that corresponds to the product of H1·H2, which migrates similarly as the H1·T in agarose gel. Displacement reaction between H2 and H1·T releases T which is recycled to react with another H1 to produce H1·T until the supply of H1 is exhausted. H1·H2 reacts with hairpin H3 and produces a band that correspond to products of H1·H2·H3, which migrates similarly with H1·H2 in agarose gel. In 2 hours, there remains a band of H3, which does not react with H1·H2. H1·H2·H3 reacts with hairpin H4, which causes a chain reaction of alternating kinetic escapes by H3 and H4 species corresponding to polymerization into a nicked double helix. Amplification continues until the supply of H3 and H4 are exhausted. As shown in FIG. S1, H1·H2·H3·H4 complex with larger molecular weight exhibits a smear band.

Table 1 below provides the DNA sequences employed in this work, the bases are listed from the 5' end to 3' end

| Category | Name | Sequence |
|---|---|---|
| Probe | H1 | ACTCAGCTTGTCAAATACACGAA TGTCTCCGTGTATTTGACAAGTA CCTTTTTTTT-NH$_2$ |
| Helper | H2 | ACACGGAGACATTCGTGTATTTG ACAAGAATGTCTCACAATGGTGT TTGTT |
| Helper | H3 | ACAATGGTGTTTGTTTCTGAAAC AACAAACACCATTGTGAGACATT |
| Helper | H4 | GTTTCAGAAACAAACACCATTGT AATGTCTCACAATGGTGTTTGTT |
| Target | T | CGTGTATTTGACAAGCTGAGT |
| Non-complementary | C35 | AGTGTATTTGACAAGCTGAGA |
| Non-complementary | C3 | CGTGTATTTGACAAGCTGAGA |
| Non-complementary | C5 | AGTGTATTTGACAAGCTGAGT |
| Negative control for H2 | H2 Control | GCGAGCCTGTATCTGCGGTCGCT TGTGAACGAGGAGTAAGCGTCCC GTGCG |
| Probe | H1' | CGCGTACCAAAAGTAATAATGAA TGTCTCCATTATTACTTTTGGAT CCGTTTTTTT-NH$_2$ |
| Target | T' | CATTATTACTTTTGGTACGCG |
| Helper | H2' | TAATGGAGACATTCATTATTACT TTTGGAATGTCTCACAATGGTGT TTGTT |

Table 2 below provides exemplary parameters used in the computational model

| | | Parameters | | |
|---|---|---|---|---|
| # | Reactions | Name | Value | Unit |
| 1 | H1 + Target → H1T | k1_on | $10^9$ | $M^{-1}s^{-1}$ |
| 2 | H1T → H1 + Target | k1_off | 0 | $s^{-1}$ |
| 3 | H1T + H2 → H1H2 + Target | k2_on | $10^9$ | $M^{-1}s^{-1}$ |
| 4 | H1H2 + Target | k2_off | 0 | $s^{-1}$ |

Exemplary Embodiments

The following exemplary embodiments are illustrative only and do not necessarily limit the scope of the present disclosure or of the claims attached hereto.

Embodiment 1. A detector, comprising:

a first portion of graphene;

a first hairpin probe (H1) comprising a plurality of nucleotides, the first hairpin probe (H1) being linked to and being in electronic communication with the first portion of graphene, in its hairpin configuration, the first hairpin probe (H1) comprising (a) a bottom portion linked to the portion of graphene, (b) a paired portion, and (c) optionally an unpaired end portion, the first hairpin probe (H1) being configured to open upon binding by a target molecule (T) (e.g., a nucleotide) with the paired portion of the hairpin probe (H1), the binding giving rise to an H1-T complex having a paired region formed between the first hairpin probe (H1) and the target (T), the H1-T complex further having a protruding segment.

Suitable targets include, e.g., nucleotide, proteins, chemical species, drug molecules, contaminants, biomolecules, metals, or any combination thereof. Proteins are particularly suitable targets. Contaminants (e.g., bacteria, viruses, and the like) are also suitable targets.

The length of a target can be suitably 15 nucleotides (nt) or longer, though this is not a requirement. A target can have a length of, e.g., 1-10 nt, 1-50 nt, 1-100 nt, 1-1000 nt, 1-5000 nt, or even greater than 5000 nt. The target can suitably have a length of from about 10 to about 2000 nt, or even from about 15 nt to about 1500 nt and all intermediate values, e.g., 15-1500, 20-1200, 30-1000, 50-700, 75-500, or even 100-300 nt.

Embodiment 2. The detector of Embodiment 1, wherein the paired portion of the first hairpin probe comprises an aptamer region, the aptamer region being configured to bind to the target molecule (T). An aptamer can be configured and/or selected based on the target the detector is intended to detect.

Aptamers can be selected for virtually any desired target, including non-immunogenic or toxic proteins. Aptamers can be, e.g., via the systematic evolution of ligands by exponential enrichment (SELEX) method, without the constraints imposed by having to be selected or produced in a living organism. E.g., Sensors (Basel). 2008 July; 8(7): 4296-4307, incorporated herein by reference in its entirety for all purposes.

Embodiment 3. The detector of Embodiment 1, wherein the paired portion of the first hairpin probe (H1) comprises at least 2 base-base hybridized pairs. (By base-base hybridization is meant hydrogen bond coordination between two bases, e.g., an A-T base paid hybridization and/or a C-G base pair hybridization.)

Embodiment 4. The detector of Embodiment 3, wherein the paired portion of the first hairpin probe (H1) comprises from 2 to 200 base-base hybridized pairs.

Without being bound to any particular theory, hairpin structures can have identical secondary structures, with stems of, e.g., length 15-20 bp. a toehold of, e.g., length 6-8 nt and a loop of, e.g., length 8-15 nt. The length of probe H1 can be, e.g., 56-72 nt, though this is not a requirement.

Embodiment 5. The detector of any of Embodiments 1-4, further comprising an amount of a first hairpin helper (H2) that comprises a plurality of polynucleotides, the first hairpin helper (H2) further being capable of binding to the protruding segment and the paired region of the H1-T complex so as to displace the target (T) from the H1-T complex and give rise to a H1-H2 complex having a protruding segment.

Without being bound to any particular theory, a first hairpin helper can be designed according to the secondary structure of H1 so as to displace the target T from the H1-T complex. A H2 structure can have, e.g., a stem of length 8-15 bp, a toehold of length 5-10 nt, and a loop of length 15 nt. A H2 can have a length of from about 51 to about 75 nt, in some embodiments.

The following is an exemplary calculation regarding the molecular weight (M.W.) of exemplary nucleic acids.

M.W. of ssDNA=(# nucleotides×303.7)+79.0

M.W. of dsDNA=(# nucleotides×607.4)+157.9

M.W. of 3'-NH2 of H1 is 209.2 g/mol

According to the foregoing, the M.W. of an exemplary H1-H2 complex can be 29,905 g/mol and the M.W. of H1-T complex is 23,831 g/mol.

Embodiment 6. The detector of Embodiment 5, further comprising an amount of a second hairpin helper (H3) that comprises a plurality of polynucleotides, the second hairpin helper (H3) further comprising a toehold portion that is capable of binding (e.g., hybridizing) to the protruding segment of the H1-H2 complex so as open second hairpin helper (H3) and give rise to a H1-H2-H3 complex having a protruding segment.

Again without being bound to any particular theory, H3 can be designed according to the secondary structure of H1-H2 complex. H3 can have, e.g., a stem of length 15-20 bp, a toehold of, e.g., length 6-8 nt, and a loop of, e.g., length 6-8 nt, which means that the length of H3 can be 42-51 nt. Applying the M.W. calculations above, the molecular weight (M.W.) of an exemplary H1-H2 complex is 29,905 g/mol and the M.W. of an exemplary H1-H2-H3 complex is 51,069.5 g/mol.

Embodiment 7. The detector of Embodiment 6, further comprising an amount of a third hairpin helper (H4) that comprises a plurality of polynucleotides, the third hairpin helper (H4) further comprising a toehold portion capable of binding (e.g., hybridizing) to the protruding segment of the H1-H2-H3 complex so as give rise to a H1-H2-H3-H4 complex.

H4 can be, e.g., designed according to the secondary structure of H1-H2-H3 complex and it can have a stem of, e.g., length 15-20 bp, a toehold of, e.g., length 6-8 nt, and a loop of, e.g., length 6-8 nt, which means that the length of H4 can be, e.g., 42-51 nt.

Applying the M.W. calculations above, the M.W. of an exemplary H1-H2-H3 complex can be 51,069.5 g/mol, and the M.W. of an exemplary H1-H2-H3-H4 complex can be 71,815.6 g/mol. (With the chain reaction hybridization between H3 and H3, the M.W. of H1-H2-(H3-H4) will increase.)

Embodiment 8. The detector of any of Embodiments 1-7, wherein the detector comprises a plurality of hairpin probes (H1) being linked to and in electronic communication with the first portion of graphene.

A variety of linkers can be used. Some exemplary linkers include, e.g., 1-Pyrenebutyric acid N-hydroxysuccinimide ester (with aminated probe DNA); metallic nanoparticles (e.g., gold nanoparticles with sulfureted probe DNA); 4-carboxybenzenediazonium tetrafluoroborate (or other carboxy-benzenediazonium compounds).

Embodiment 9. The detector of any of Embodiments 1-8, further comprising a second hairpin probe (H1') comprising a plurality of nucleotides, the second hairpin probe (H1') being linked to and in electronic communication with the first portion of graphene, in its hairpin configuration, the second hairpin probe (H1') comprising (a) a bottom portion linked to the first portion of graphene, (b) a paired portion, and (c) optionally an unpaired end portion, the second hairpin probe (H1') differing from the first hairpin probe (H1) by at least one nucleotide.

Embodiment 10. The detector of any of Embodiments 1-9, further comprising a monitor in electronic communication with the first portion of graphene, the monitor capable of detecting a signal related to one or more of (a) binding between a target and the first hairpin probe (H1) and (b) formation of a complex that comprises the first hairpin probe (H1) and one or more hairpin helpers.

Embodiment 11. The detector of Embodiment 10, wherein the signal is a change in Dirac voltage. Other exemplary signals include, e.g., source-drain current at a fixed bias voltage and fixed gate voltage.

Embodiment 12. A method, comprising contacting a detector according to any of Embodiments 1-11 to a sample comprising an amount of a target (T).

Embodiment 13. The method of Embodiment 12, further comprising detecting a signal related to one or more of (a) binding between the target (T) and the first hairpin probe (H1), and (b) formation of a complex that comprises the first hairpin probe (H1) and one or more hairpin helpers.

Embodiment 14. The method of any of Embodiments 12-13, wherein the target comprises 20 or fewer nucleotides.

Embodiment 15. The method of any of Embodiments 12-14, wherein the target is present from about 1 aM to about 100 μM, e.g., from about 10 fM to about 100 fM.

Embodiment 16. The method of any of Embodiments 12-15, wherein the target comprises a nucleotide, protein, a chemical species, a drug molecule, a contaminant, a biomolecule, a metal, or any combination thereof.

Embodiment 17. The method of any of Embodiments 12-16, further comprising contacting the detector to a sample comprising two or more targets.

Embodiment 18. The method of Embodiment 17, further comprising detecting a signal related to one or more of (a) binding between one or more of the two or more targets and the first hairpin probe (H1), (b) a complex that comprises the first hairpin probe (H1) and one or more hairpin helpers, (c) binding between one or more of the two or more targets and the second hairpin probe (H1'), and (d) a complex that comprises the second hairpin probe (H1') and one or more hairpin helpers Embodiment 19. A method, comprising:

to a first hairpin probe (H1) comprising a plurality of nucleotides, the first hairpin probe (H1) being linked to and in electronic communication with the first portion of graphene, in its hairpin configuration, the first hairpin probe (H1) comprising (a) a bottom portion linked to the portion of graphene, (b) a paired portion, and (c) optionally an unpaired end portion, contacting the first hairpin probe (H1) with a target molecule (T) under such conditions that the target molecule (T) binds (e.g., hybridizes) with the paired portion of the hairpin probe (H1) and the first hairpin probe (H1) opens, the binding giving rise to an H1-T complex having a paired region formed between the first hairpin probe (H1) and the target (T), the H1-T complex further having a protruding segment.

Embodiment 20. The method of Embodiment 19, further comprising contacting the H1-T complex with a first hairpin helper (H2) that comprises a plurality of polynucleotides, the first hairpin helper (H2) being capable of binding to the protruding segment and the paired region of the H1-T complex, the contacting being performed so as to displace the target (T) from the H1-T complex and give rise to a H1-H2 complex having a protruding segment.

Embodiment 21. The method of Embodiment 20, further comprising contacting the H1-H2 complex with a second hairpin helper (H3) that comprises a plurality of polynucleotides, the second hairpin helper (H3) further comprising a toehold portion that is capable of binding to the protruding segment of the H1-H2 complex, the contacting being performed so as open second hairpin helper (H3) and give rise to a H1-H2-H3 complex having a protruding segment.

Embodiment 22. The method of Embodiment 21, further comprising contacting the H1-H2-H3 complex with a third hairpin helper (H4) that comprises a plurality of polynucleotides, the third hairpin helper (H4) further comprising a toehold portion that is capable of binding to the protruding segment of the H1-H2-H3 complex, the contacting being performed so as to give rise to a H1-H2-H3-H4 complex.

Embodiment 23. The method of any of Embodiments 19-22, further comprising effecting contact between target (T) displaced from the H1-T complex and a further hairpin probe (H1,2), the second hairpin probe (H1,2) being complementary to the target (T), the contacting giving rise to an H1,2-T complex having a paired region formed between the further hairpin probe (H1,2) and the target (T), the H1,2-T complex further having a protruding segment.

Embodiment 24. The method of Embodiment 23, further comprising contacting the H1,2-T complex with a first hairpin helper (H2) that comprises a plurality of polynucleotides, the first hairpin helper (H2) further being capable of hybridizing to the protruding segment and the paired region of the H1,2-T complex, the contacting being performed so as to displace the target (T) from the H1,2-T complex and give rise to a H1,2-H2 complex having a protruding segment.

Embodiment 25. The method of Embodiment 20, further comprising contacting the H1,2-H2 complex with a second hairpin helper (H3) that comprises a plurality of polynucleotides, the second hairpin helper (H3) further comprising a toehold portion that is capable of binding to the protruding segment of the H1,2-H2 complex, the contacting being performed so as open second hairpin helper (H3) and give rise to a H1,2-H2-H3 complex having a protruding segment.

Embodiment 26. The method of Embodiment 21, further comprising contacting the H1,2-H2-H3 complex with a third hairpin helper (H4) that comprises a plurality of polynucleotides, the third hairpin helper (H4) further comprising a toehold portion that is capable of binding to the protruding segment of the H1,2-H2-H3 complex, the contacting being performed so as give rise to a H1,2-H2-H3-H4 complex.

Embodiment 27. The method of any of Embodiments 20-26, further comprising detecting a signal related to one or more of (a) binding between a target and the first hairpin probe (H1), and (b) formation of a complex that comprises the first hairpin probe (H1) and one or more hairpin helpers.

Embodiment 28. The method of Embodiment 27, wherein the signal is a change in Dirac voltage.

Embodiment 29. The method of any of Embodiments 20-28, wherein the target comprises 20 or fewer nucleotides.

Embodiment 30. The method of any of Embodiments 20-29, wherein the target is present at a concentration of less than about 100 fM.

Embodiment 31. The method of any one of Embodiments 20-29, wherein the target comprises a nucleotide, a protein, a chemical species, a drug molecule, a contaminant, a biomolecule, a metal, or any combination thereof.

Embodiment 32. The method of any of Embodiments 20-31, further comprising contacting the detector to a sample comprising two or more targets.

Embodiment 33. A method, comprising:

to one or more first hairpin probes (H1$_i$, i=1 to n) each comprising a different plurality of nucleotides, the plurality of first hairpin probes being linked to and in electronic communication with a first portion of graphene, each of the plurality of first hairpin probes in its hairpin configuration comprising (a) a bottom portion linked to the portion of graphene, (b) a paired portion, and (c) optionally an unpaired end portion, contacting the plurality of first hairpin probes with one or more target molecules (T$_j$, j=1 to m) under such conditions that one or more of the target molecules binds (e.g., hybridizes) with the paired portion of one or more first hairpin probes and the first hairpin probe opens, the binding giving rise to an H1$_i$-T$_j$ complex having a paired region formed between the first hairpin probe (H1$_i$) and the target (T$_j$), the H1$_i$-T$_j$ complex further having a protruding segment.

Embodiment 34. The method of Embodiment 33, further comprising contacting a H1i-Tj complex with one or more first hairpin helpers (H2) that comprises a plurality of polynucleotides, the first hairpin helper (H2) further comprising a toehold portion that is capable of binding to the protruding segment and the paired region of the H1$_i$-T$_j$ complex, the contacting being performed so as to displace the target (T$_i$) from the H1$_i$-T$_j$ complex and give rise to a Hi-H2 complex having a protruding segment, one or more of the first hairpin helpers H2 optionally being unique to a particular H1$_i$-T$_j$ complex.

Embodiment 35. The method of Embodiment 34, further comprising contacting the H1i-Hi complex with a second hairpin helper (H3) that comprises a plurality of polynucleotides, the second hairpin helper (H3) further comprising a toehold portion capable of binding to the protruding segment of the H1$_i$-H2$_i$ complex, the contacting being performed so as open second hairpin helper (H3) and give rise to a H1$_i$-H2-H3 complex having a protruding segment.

Embodiment 36. The method of Embodiment 35, further comprising contacting the H1$_i$-H2-H3 complex with a third hairpin helper (H4) that comprises a plurality of polynucleotides, the third hairpin helper (H4) further comprising a toehold portion capable of binding to the protruding segment of the H1$_i$-H2-H3 complex, the contacting being performed so as open third hairpin helper (H4) and give rise to a H1$_i$-H2-H3-H4 complex having a protruding segment.

Embodiment 37. The method of any of Embodiments 33-36, further comprising detecting a signal related to one or more of (a) binding between one or more of the two or more targets (T$_i$) and one or more first hairpin probes (H1$_j$) and (b) a complex that comprises the first hairpin probe (H1$_j$) and one or more hairpin helpers.

Embodiment 38. The method of Embodiment 37, wherein the signal comprises a Dirac voltage.

REFERENCES

The following documents are incorporated herein in their entireties for any and all purposes.
(1) Sawyers, C. L. Nature 2008, 452, 548-552.
(2) McManus, D. D.; Freedman, J. E. Nat Rev Cardiol 2015, 12, 711-717.
(3) Zhang, A.; Lieber, C. M. Chemical Reviews 2016, 116, 215-257.
(4) Gao, Z.; Kang, H.; Naylor, C. H.; Streller, F.; Ducos, P.; Serrano, M. D.; Ping, J.; Zauberman, J.; Rajesh; Carpick, R. W.; Wang, Y.-J.; Park, Y. W.; Luo, Z.; Ren, L.; Johnson, A. T. C. ACS Applied Materials & Interfaces 2016, 8, 27546-27552.
(5) Ping, J.; Vishnubhotla, R.; Vrudhula, A.; Johnson, A. T. C. ACS Nano 2016, 10, 8700-8704.
(6) Xu, G.; Abbott, J.; Qin, L.; Yeung, K. Y. M.; Song, Y.; Yoon, H.; Kong, J.; Ham, D. Nat. Commun. 2014, 5.
(7) Cai, B.; Wang, S.; Huang, L.; Ning, Y.; Zhang, Z.; Zhang, G.-J. ACS Nano 2014, 8, 2632-2638.
(8) Xu, S.; Zhan, J.; Man, B.; Jiang, S.; Yue, W.; Gao, S.; Guo, C.; Liu, H.; Li, Z.; Wang, J.; Zhou, Y. Nat. Commun. 2017, 8, 14902.
(9) Okahata, Y.; Kawase, M.; Niikura, K.; Ohtake, F.; Furusawa, H.; Ebara, Y. Anal. Chem. 1998, 70, 1288-1296.
(10) Hayes, J.; Peruzzi, P. P.; Lawler, S. Trends in Molecular Medicine 20, 460-469.
(11) Lerner, M. B.; Matsunaga, F.; Han, G. H.; Hong, S. J.; Xi, J.; Crook, A.; Perez-Aguilar, J. M.; Park, Y. W.; Saven, J. G.; Liu, R.; Johnson, A. T. C. Nano Lett. 2014, 14, 2709-2714.
(12) Ouldridge, T. E.; Sulc, P.; Romano, F.; Doye, J. P. K.; Louis, A. A. Nucleic Acids Res. 2013, 41, 8886-8895.
(13) SantaLucia, J. Proceedings of the National Academy of Sciences 1998, 95, 1460-1465.
(14) Bonnet, G.; Tyagi, S.; Libchaber, A.; Kramer, F. R. Proceedings of the National Academy of Sciences 1999, 96, 6171-6176.
(15) Tsourkas, A.; Behlke, M. A.; Rose, S. D.; Bao, G. Nucleic Acids Res. 2003, 31, 1319-1330.
(16) Choi, H. M. T.; Beck, V. A.; Pierce, N. A. ACS Nano 2014, 8, 4284-4294.
(17) Heller, I.; Janssens, A. M.; Mnnik, J.; Minot, E. D.; Lemay, S. G.; Dekker, C. Nano Lett. 2007, 8, 591-595.
(18) Lerner, M. B.; Resczenski, J. M.; Amin, A.; Johnson, R. R.; Goldsmith, J. I.; Johnson, A. T. C. J. Am. Chem. Soc. 2012, 134, 14318-14321.
(19) Wolfe, B. R.; Pierce, N. A. ACS Synthetic Biology 2015, 4, 1086-1100.
(20) Dirks, R. M.; Pierce, N. A. Proc. Natl. Acad. Sci. U.S.A 2004, 101, 15275-15278.
(21) Morozov, S. V.; Novoselov, K. S.; Katsnelson, M. I.; Schedin, F.; Elias, D. C.; Jaszczak, J. A.; Geim, A. K. Phys. Rev. Lett. 2008, 100, 016602.
(22) Chen, F.; Xia, J.; Ferry, D. K.; Tao, N. Nano Lett. 2009, 9, 2571-2574.
(23) Ping, J.; Xi, J.; Saven, J. G.; Liu, R.; Johnson, A. T. C. Biosensors and Bioelectronics 2015.

What is claimed:

1. A detector, comprising:

a first portion of functionalized graphene;

a first hairpin probe (H1) comprising a plurality of nucleotides, the first hairpin probe (H1) being linked through a graphene field effect transistor (GFET) to the first portion of functionalized graphene, in its hairpin configuration, the first hairpin probe (H1) comprising (a) a bottom portion linked to the portion of graphene, and (b) a paired portion, and the first hairpin probe (H1) opening upon binding by a target molecule (T) with the paired portion of the hairpin probe (H1), the binding giving rise to an H1-T complex having a paired region formed between the first hairpin probe (H1) and the target (T), the H1-T complex further having a protruding segment.

2. The detector of claim 1, wherein the paired portion of the first hairpin probe comprises an aptamer region, the aptamer region being configured to bind to the target molecule (T).

3. The detector of claim 1, further comprising an amount of a first hairpin helper (H2) that comprises a plurality of polynucleotides, the first hairpin helper (H2) further being capable of binding to the protruding segment and the paired region of the H1-T complex so as to displace the target (T) from the H1-T complex and give rise to a H1-H2 complex having a protruding segment.

4. The detector of claim 3, further comprising an amount of a second hairpin helper (H3) that comprises a plurality of polynucleotides, the second hairpin helper (H3) further comprising a toehold portion that is capable of binding to the protruding segment of the H1-H2 complex so as open second hairpin helper (H3) and give rise to a H1-H2-H3 complex having a protruding segment.

5. The detector of claim 4, further comprising an amount of a third hairpin helper (H4) that comprises a plurality of polynucleotides, the third hairpin helper (H4) further comprising a toehold portion capable of binding to the protruding segment of the H1-H2-H3 complex so as give rise to a H1-H2-H3-H4 complex.

6. The detector of claim 1, further comprising a second hairpin probe (H1') comprising a plurality of nucleotides, the second hairpin probe (H1') being linked through a graphene field effect transistor (GFET) to the first portion of graphene, in its hairpin configuration, the second hairpin probe (H1') comprising (a) a bottom portion linked to the first portion of graphene, and (b) a paired portion, the second hairpin probe (H1') differing from the first hairpin probe (H1) by at least one nucleotide.

7. The detector of claim 1, further comprising a monitor in electronic communication with the first portion of graphene, the monitor capable of detecting a signal related to one or more of (a) binding between a target and the first hairpin probe (H1) and (b) formation of a complex that comprises the first hairpin probe (H1) and one or more hairpin helpers.

8. The detector of claim 7, wherein the signal is a change in Dirac voltage.

9. A method of detecting a target, comprising to a first hairpin probe (H1) comprising a plurality of nucleotides, the first hairpin probe (H1) being linked through a graphene field effect transistor (GFET) to a first portion of graphene, in its hairpin configuration, the first hairpin probe (H1) comprising (a) a bottom portion linked to the portion of graphene, (b) a paired portion, contacting the first hairpin probe (H1) with a target molecule (T) under such conditions that the target molecule (T) binds with the paired portion of the hairpin probe (H1) and the first hairpin probe (H1) opens, the binding giving rise to an H1-T complex having a paired region formed between the first hairpin probe (H1) and the target (T), the H1-T complex further having a protruding segment.

10. The method of claim 9, further comprising contacting the H1-T complex with a first hairpin helper (H2) that comprises a plurality of polynucleotides, the first hairpin helper (H2) being capable of binding to the protruding segment and the paired region of the H1-T complex, the contacting being performed so as to displace the target (T) from the H1-T complex and give rise to a H1-H2 complex having a protruding segment.

11. The method of claim 10, further comprising contacting the H1-H2 complex with a second hairpin helper (H3) that comprises a plurality of polynucleotides, the second hairpin helper (H3) further comprising a toehold portion that is capable of binding to the protruding segment of the H1-H2 complex, the contacting being performed so as open second hairpin helper (H3) and give rise to a H1-H2-H3 complex having a protruding segment.

12. The method of claim 9, further comprising effecting contact between target (T) displaced from the H1-T complex and a further hairpin probe (H1,2), the second hairpin probe (H1,2) being complementary to the target (T), the contacting giving rise to an H1,2-T complex having a paired region formed between the further hairpin probe (H1,2) and the target (T), the H1,2-T complex further having a protruding segment.

13. The method of claim 12, further comprising contacting the H1,2-T complex with a first hairpin helper (H2) that comprises a plurality of polynucleotides, the first hairpin helper (H2) further being capable of binding to the protruding segment and the paired region of the H1,2-T complex, the contacting being performed so as to displace the target (T) from the H1,2-T complex and give rise to H1,2-H2 complex having a protruding segment.

14. The method of claim 10, further comprising detecting a signal related to one or more of (a) binding between a target and the first hairpin probe (H1), and (b) formation of a complex that comprises the first hairpin probe (H1) and one or more hairpin helpers.

15. The method of claim 14, wherein the signal is a change in Dirac voltage.

16. The method of claim 10, wherein the target is present at a concentration of less than about 100 fM.

17. A method of detecting a target, comprising:

to one or more first hairpin probes (H1$_i$=1 to n) each comprising a different plurality of nucleotides, the plurality of first hairpin probes being linked through a graphene field effect transistor (GFET) to and a first portion of graphene, each of the plurality of first hairpin probes in its hairpin configuration comprising (a) a bottom portion linked to the portion of graphene, (b) a paired portion, and contacting the plurality of first hairpin probes with one or more target molecules (T$_j$, j=1 to m) under such conditions that one or more of the target molecules binds with the paired portion of one or more first hairpin probes and the first hairpin probe opens, the binding giving rise to an H1$_i$-T$_j$ complex having a paired region formed between the first hairpin probe (Hi$_1$) and the target (T$_j$), the H1$_i$-T complex further having a protruding segment.

18. The method of claim 17, further comprising contacting a $H1_i$-$T_j$ complex with one or more first hairpin helpers (H2) that comprises a plurality of polynucleotides, the first hairpin helper (H2) further comprising a toehold portion that is capable of binding to the protruding segment and the paired region of the $H1_i$-$T_j$ complex, the contacting being performed so as to displace the target ($T_i$) from the $H1_i$-$T_i$ complex and give rise to a $H_i$-H2 complex having a protruding segment, one or more of the first hairpin helpers H2 optionally being unique to a particular $H1_i$-$T_j$ complex.

19. The method of claim 18, further comprising contacting the $H1_i$-$H_i$ complex with a second hairpin helper (H3) that comprises a plurality of polynucleotides, the second hairpin helper (H3) further comprising a toehold portion capable of binding to the protruding segment of the $H1_i$-$H2_i$ complex, the contacting being performed so as open second hairpin helper (H3) and give rise to a $H1_i$-H2-H3 complex having a protruding segment.

20. The method of claim 17, further comprising detecting a signal related to one or more of (a) binding between one or more of the two or more targets ($T_i$) and one or more first hairpin probes ($H1_j$) and (b) a complex that comprises the first hairpin probe ($H1_j$) and one or more hairpin helpers.

\* \* \* \* \*

SEQUENCE LISTING

<160> NUMBER OF SEQ ID NOS: 12

<210> SEQ ID NO 1
<211> LENGTH: 56
<212> TYPE: DNA
<213> ORGANISM: Artificial Sequence
<220> FEATURE:
<223> OTHER INFORMATION: synthetic construct
<220> FEATURE:
<221> NAME/KEY: misc_feature
<222> LOCATION: (56)..(56)
<223> OTHER INFORMATION: 3'-amino modification (NH2)

<400> SEQUENCE: 1
actcagcttg tcaaatacac gaatgtctcc gtgtatttga caagtacctt tttttt          56

<210> SEQ ID NO 2
<211> LENGTH: 51
<212> TYPE: DNA
<213> ORGANISM: Artificial Sequence
<220> FEATURE:
<223> OTHER INFORMATION: synthetic construct

<400> SEQUENCE: 2
acacggagac attcgtgtat ttgacaagaa tgtctcacaa tggtgtttgt t          51

<210> SEQ ID NO 3
<211> LENGTH: 46
<212> TYPE: DNA
<213> ORGANISM: Artificial Sequence
<220> FEATURE:
<223> OTHER INFORMATION: synthetic construct

<400> SEQUENCE: 3
acaatggtgt ttgtttctga aacaacaaac accattgtga gacatt          46

<210> SEQ ID NO 4
<211> LENGTH: 46
<212> TYPE: DNA
<213> ORGANISM: Artificial Sequence
<220> FEATURE:
<223> OTHER INFORMATION: synthetic construct

<400> SEQUENCE: 4
gtttcagaaa caaacaccat tgtaatgtct cacaatggtg tttgtt          46

<210> SEQ ID NO 5
<211> LENGTH: 21
<212> TYPE: DNA
<213> ORGANISM: Artificial Sequence
<220> FEATURE:
<223> OTHER INFORMATION: synthetic construct

<400> SEQUENCE: 5
cgtgtatttg acaagctgag t          21

<210> SEQ ID NO 6
<211> LENGTH: 21
<212> TYPE: DNA
<213> ORGANISM: Artificial Sequence
<220> FEATURE:
<223> OTHER INFORMATION: synthetic construct

<400> SEQUENCE: 6
agtgtatttg acaagctgag a          21

-continued

```
<210> SEQ ID NO 7
<211> LENGTH: 21
<212> TYPE: DNA
<213> ORGANISM: Artificial Sequence
<220> FEATURE:
<223> OTHER INFORMATION: synthetic construct

<400> SEQUENCE: 7
cgtgtatttg acaagctgag a                                            21

<210> SEQ ID NO 8
<211> LENGTH: 21
<212> TYPE: DNA
<213> ORGANISM: Artificial Sequence
<220> FEATURE:
<223> OTHER INFORMATION: synthetic construct

<400> SEQUENCE: 8
agtgtatttg acaagctgag t                                            21

<210> SEQ ID NO 9
<211> LENGTH: 51
<212> TYPE: DNA
<213> ORGANISM: Artificial Sequence
<220> FEATURE:
<223> OTHER INFORMATION: synthetic construct

<400> SEQUENCE: 9
gcgagcctgt atctgcggtc gcttgtgaac gaggagtaag cgtcccgtgc g           51

<210> SEQ ID NO 10
<211> LENGTH: 56
<212> TYPE: DNA
<213> ORGANISM: Artificial Sequence
<220> FEATURE:
<223> OTHER INFORMATION: synthetic construct
<220> FEATURE:
<221> NAME/KEY: misc_feature
<222> LOCATION: (56)..(56)
<223> OTHER INFORMATION: 3'-amino modification (NH2)

<400> SEQUENCE: 10
cgcgtaccaa aagtaataat gaatgtctcc attattactt ttggatccgt tttttt      56

<210> SEQ ID NO 11
<211> LENGTH: 21
<212> TYPE: DNA
<213> ORGANISM: Artificial Sequence
<220> FEATURE:
<223> OTHER INFORMATION: synthetic construct

<400> SEQUENCE: 11
cattattact tttggtacgc g                                            21

<210> SEQ ID NO 12
<211> LENGTH: 51
<212> TYPE: DNA
<213> ORGANISM: Artificial Sequence
<220> FEATURE:
<223> OTHER INFORMATION: synthetic construct

<400> SEQUENCE: 12
taatggagac attcattatt acttttggaa tgtctcacaa tggtgtttgt t           51
```